United States Patent
Zhang

(10) Patent No.: US 10,630,576 B2
(45) Date of Patent: Apr. 21, 2020

(54) VIRTUAL NETWORK ROUTING TO DYNAMIC END POINT LOCATIONS IN SUPPORT OF SERVICE-BASED TRAFFIC FORWARDING

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/440,779

(22) Filed: Feb. 23, 2017

(65) Prior Publication Data

US 2018/0041435 A1 Feb. 8, 2018

Related U.S. Application Data

(60) Provisional application No. 62/371,628, filed on Aug. 5, 2016, provisional application No. 62/376,820, filed (Continued)

(51) Int. Cl.
*H04L 12/725* (2013.01)
*H04L 12/751* (2013.01)
(Continued)

(52) U.S. Cl.
CPC .......... *H04L 45/30* (2013.01); *H04L 12/4633* (2013.01); *H04L 12/4641* (2013.01);
(Continued)

(58) Field of Classification Search
CPC ... H04L 45/30; H04L 45/586; H04L 12/4641; H04L 67/34; H04L 41/0803;
(Continued)

(56) References Cited

U.S. PATENT DOCUMENTS 7,227,863 B1 6/2007 Leung et al.
8,478,902 B1 7/2013 Holland et al.
(Continued)

FOREIGN PATENT DOCUMENTS

CN 101352003 A 1/2009
CN 101808030 A 8/2010
(Continued)

OTHER PUBLICATIONS

International Search Report dated Oct. 27, 2017 for corresponding International Application No. PCT/CN2017/096172 filed Aug. 7, 2017.
(Continued)

*Primary Examiner* — Moo Jeong

(57) ABSTRACT

A method and apparatus for routing packets to a destination end point over a virtual network (VN) pre-configured on a network. The routing is performed by a VN virtual router (v-router) associated with a node of the VN. The v-router receives a data packet, obtains an indication of location of the destination end point from a connection management (CM) entity tracking the end point, and selects a logical tunnel or next VN node to forward the data packet to. The CM entity tracks end points upon registration and provides updates upon a request or other trigger.

14 Claims, 26 Drawing Sheets

Related U.S. Application Data on Aug. 18, 2016, provisional application No. 62/399,206, filed on Sep. 23, 2016.

(51) Int. Cl.

| | |
|---|---|
| *H04W 40/00* | (2009.01) |
| *H04W 64/00* | (2009.01) |
| *H04W 76/11* | (2018.01) |
| *H04L 29/08* | (2006.01) |
| *H04L 12/46* | (2006.01) |
| *H04W 40/20* | (2009.01) |
| *H04L 12/713* | (2013.01) |
| *H04W 72/04* | (2009.01) |
| *H04L 12/741* | (2013.01) |
| *H04W 12/06* | (2009.01) |
| *H04W 24/08* | (2009.01) |
| *H04W 60/00* | (2009.01) |
| *H04W 4/70* | (2018.01) |
| *H04L 12/24* | (2006.01) |
| *H04L 12/715* | (2013.01) |
| *H04W 4/06* | (2009.01) |

(52) U.S. Cl.
CPC ...... *H04L 12/4645* (2013.01); *H04L 41/0803* (2013.01); *H04L 45/02* (2013.01); *H04L 45/586* (2013.01); *H04L 45/74* (2013.01); *H04L 45/745* (2013.01); *H04L 67/34* (2013.01); *H04W 4/70* (2018.02); *H04W 12/06* (2013.01); *H04W 24/08* (2013.01); *H04W 40/00* (2013.01); *H04W 40/20* (2013.01); *H04W 60/00* (2013.01); *H04W 64/00* (2013.01); *H04W 72/042* (2013.01); *H04W 76/11* (2018.02); *H04L 41/12* (2013.01); *H04L 45/302* (2013.01); *H04L 45/64* (2013.01); *H04W 4/06* (2013.01)

(58) Field of Classification Search
CPC .............. H04L 12/4645; H04L 45/745; H04L 12/4633; H04L 45/02; H04L 45/74; H04L 45/302; H04L 41/12; H04L 45/64; H04W 64/00; H04W 76/11; H04W 40/20; H04W 4/70; H04W 72/042; H04W 12/06; H04W 24/08; H04W 60/00; H04W 40/00; H04W 4/06; H04W 67/34; H04W 12/4633

See application file for complete search history.

(56) References Cited

U.S. PATENT DOCUMENTS

| | | | |
|---|---|---|---|
| 8,660,129 | B1 | 2/2014 | Brendel et al. |
| 9,077,640 | B2 | 7/2015 | So et al. |
| 2004/0013120 | A1 | 1/2004 | Shen |
| 2007/0117548 | A1 | 5/2007 | Fernandez-Alonso et al. |
| 2007/0153808 | A1 | 7/2007 | Parker et al. |
| 2008/0098472 | A1 | 4/2008 | Enomoto et al. |
| 2008/0192701 | A1* | 8/2008 | Jeong .................. H04W 36/02 370/331 |
| 2010/0074274 | A1 | 3/2010 | Huguies |
| 2010/0189115 | A1 | 7/2010 | Kitada |
| 2011/0111758 | A1 | 5/2011 | Liu et al. |
| 2012/0207026 | A1 | 8/2012 | Sato |
| 2012/0275787 | A1 | 11/2012 | Xiong et al. |
| 2013/0136123 | A1 | 5/2013 | Ge et al. |
| 2013/0336305 | A1 | 12/2013 | Yan et al. |
| 2013/0346585 | A1 | 12/2013 | Ueno |
| 2014/0056298 | A1 | 2/2014 | Vobbilisetty et al. |
| 2014/0269513 | A1 | 9/2014 | Yu et al. |
| 2014/0307556 | A1 | 10/2014 | Zhang et al. |
| 2014/0334485 | A1 | 11/2014 | Jain et al. |
| 2014/0362700 | A1 | 12/2014 | Zhang et al. |
| 2015/0071170 | A1 | 3/2015 | Zhang et al. |
| 2015/0072705 | A1 | 3/2015 | Zhang et al. |
| 2015/0143369 | A1 | 5/2015 | Zheng et al. |
| 2015/0200849 | A1 | 7/2015 | Wen et al. |
| 2015/0257012 | A1 | 9/2015 | Zhang et al. |
| 2015/0271067 | A1 | 9/2015 | Li et al. |
| 2015/0381493 | A1 | 12/2015 | Bansal et al. |
| 2016/0119417 | A1 | 4/2016 | Fang et al. |
| 2016/0134527 | A1* | 5/2016 | Kwak ................... H04L 45/586 370/352 |
| 2016/0150421 | A1 | 5/2016 | Li et al. |
| 2016/0156513 | A1 | 6/2016 | Zhang et al. |
| 2016/0157043 | A1 | 6/2016 | Li et al. |
| 2016/0226755 | A1 | 8/2016 | Hammam et al. |
| 2016/0285736 | A1 | 9/2016 | Gu |
| 2017/0181210 | A1* | 6/2017 | Nadella ................. H04W 48/16 |
| 2017/0201922 | A1 | 7/2017 | Akiyoshi |
| 2017/0250838 | A1 | 8/2017 | Khawer et al. |
| 2017/0374696 | A1 | 12/2017 | Doll et al. |

FOREIGN PATENT DOCUMENTS

| | | |
|---|---|---|
| CN | 102315925 A | 1/2012 |
| CN | 102549990 A | 7/2012 |
| CN | 102611629 A | 7/2012 |
| CN | 103444143 A | 12/2013 |
| CN | 103491006 A | 1/2014 |
| CN | 103534997 A | 1/2014 |
| CN | 103685026 A | 3/2014 |
| CN | 105227454 A | 1/2016 |
| WO | 2009054032 A | 4/2009 |
| WO | 2013142519 A1 | 9/2013 |
| WO | 2015180617 A1 | 12/2015 |
| WO | 2016014362 A1 | 1/2016 |

OTHER PUBLICATIONS

International Search Report dated Oct. 26, 2017 for corresponding International Application No. PCT/CN2017/096171 filed Aug. 7, 2017.

International Search Report dated Sep. 28, 2017 for corresponding International Application No. PCT/CN2017/096056 filed Aug. 4, 2017.

International Search Report dated Oct. 23, 2017 for corresponding International Application No. PCT/CN2017/096055 filed Aug. 4, 2017.

International Search Report dated Oct. 26, 2017 for corresponding International Application No. PCT/CN2017/096173 filed Aug. 7, 2017.

Zhang et al., "5G Wireless Network: MyNET and SONAC", IEEE Network vol. 29, Issue: 4, Jul.-Aug. 2015, pp. 14 to 23.

ETSI GS NFV-SWA 001 V0.2.4(Nov. 2014),Network Functions Virtualisation (NFV);Virtual Network Functions Architecture,total 93 pages.

* cited by examiner

| VN Topology Description Table | |
|---|---|
| VN ID = 1 | |
| Domain ID = 1 | VN Node ID = 1 |
| Domain ID = 2 | VN Node ID = 2 |

| End-point Location Information obtained | | |
|---|---|---|
| VN ID = 1 | | |
| End-point ID = B | Domain ID = 2 | Cluster ID = Non |
| …… | | |

| Tunnel Configuration Table | |
|---|---|
| VN ID = 1 | |
| Destination VN Node = 1 | Next Hop VN Node ID (or tunnel ID) (NN address to which the VN Node = 1 associates) |
| Destination VN Node = 2 | Next Hop VN Node ID (or tunnel ID) (NN address = 4) to which the VN Node = 2 associates |

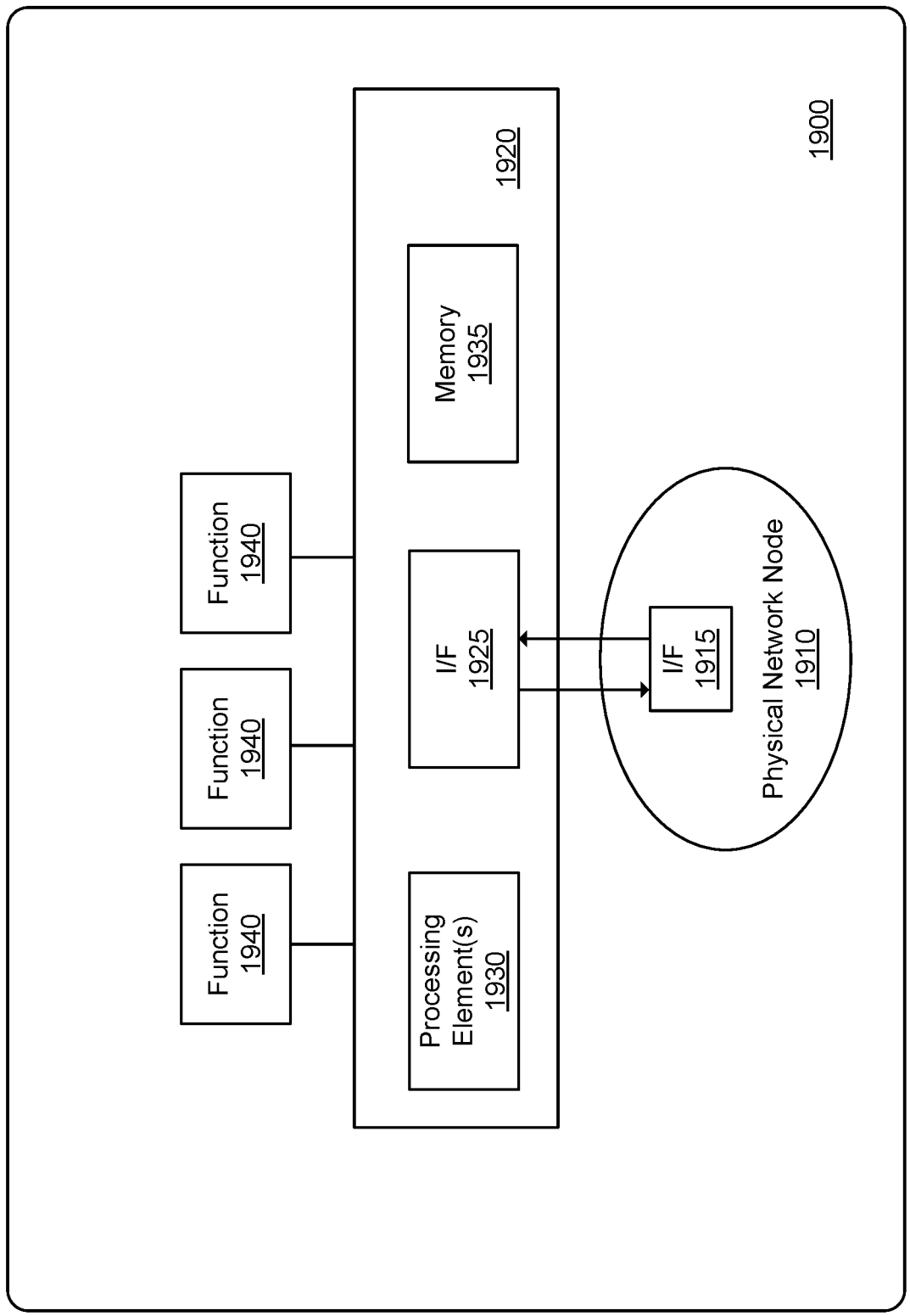

VIRTUAL NETWORK ROUTING TO DYNAMIC END POINT LOCATIONS IN SUPPORT OF SERVICE-BASED TRAFFIC FORWARDING

CROSS-REFERENCE TO RELATED APPLICATIONS

This application claims priority from U.S. Provisional Patent Application No. 62/371,628 filed on Aug. 5, 2016, to U.S. Provisional Patent Application No. 62/376,820 filed on Aug. 18, 2016, and to U.S. Provisional Patent Application No. 62/399,206 filed on Sep. 23, 2016, all of which are herein incorporated by reference.

FIELD

The present invention pertains to the field of wireless communication networks and in particular to methods and systems for service delivery in wireless communication networks.

BACKGROUND

In current 3G/4G networks, traffic is delivered to user equipment (UE) on a per-device session basis between the UE and a service provider, such as a server. A service session is established after completion of an end-to-end connection setup procedure between the UE and the service provider. This connection procedure typically introduces a latency of about 200 ms and causes considerable network overhead on the link between the UE and the service provider.

It is expected that there will be a significant increase in the number of UEs requiring service in next generation networks (e.g. 5G), such as sensors, machines, mobile devices, and other devices that will require connection. Furthermore, the data traffic will likely may become more bursty in nature with a much higher number of sessions to be served as the demand for continuous or near-continuous connectivity increases.

One of the objectives of next generation networks (e.g. 5G networks) is to provide service-based delivery of content, and avoid the overhead of per-device sessions.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments, there is provided a system and method for routing packets through a virtual network to dynamic end point locations, in support of service-based traffic forwarding. According to one embodiment, there is provided a method for routing packets to a destination end point over a virtual network (VN) pre-configured on a network. The routing is performed by a VN virtual router (v-router) associated with a VN node of the VN. The VN node is supported by an associated physical network node of the network and is interconnected with other VN nodes of the VN by logical tunnels. The method is performed by the v-router. The method includes receiving a data packet associated with the VN and specifying the destination end point. The method further includes obtaining an indication of location of the destination end point from a connection management (CM) entity tracking the end point. The method further includes selecting one of the logical tunnels to forward the data packet toward the destination end point, the logical tunnel having ingress at the VN node and having an egress at a next VN node on a logical path between the VN node and the destination end point. The method further includes submitting the data packet to the selected logical tunnel for forwarding toward the next VN node.

According to another embodiment, there is provided a method for maintaining routability of a data packet to an end point. The method can be performed by a connection management (CM) entity supporting a virtual network (VN). The method includes registering the end point with the CM entity. The method further includes tracking a location of the end point. The method further includes providing an indication of location to one or more VN virtual routers of the VN.

According to another embodiment, there is provided a virtual router (v-router) for supporting routing of packets to a destination end point over a virtual network (VN) pre-configured on a network. The v-router is associated with a VN node of the VN. The VN node is supported by an associated physical network node of the network and is interconnected with other VN nodes of the VN by logical tunnels. The v-router is configured to receive a data packet associated with the VN and specifying the destination end point. The v-router is further configured to obtain an indication of location of the destination end point from a connection management (CM) entity tracking the end point. The v-router is further configured to select one of the logical tunnels to forward the data packet toward the destination end point, the logical tunnel having ingress at the VN node and having an egress at a next VN node on a logical path between the VN node and the destination end point. The v-router is further configured to submit the data packet to the selected logical tunnel for forwarding toward the next VN node. The v-router may include appropriately configured components such as a processor, a memory, and a network interface. Such components may be physically associated with the physical network node, for example.

According to another embodiment, there is provided a connection management (CM) entity supporting a virtual network (VN). The CM entity is configured, in support of maintaining routability of a data packet to an end point, to register the end point with the CM entity. The CM entity is further configured to track a location of the end point. The CM entity is further configured to provide an indication of location to one or more VN virtual routers of the VN. The CM entity may include appropriately configured components such as a processor, a memory, and a network interface.

BRIEF DESCRIPTION OF THE FIGURES

Further features and advantages will become apparent from the following detailed description, taken in combination with the appended drawing, in which:

FIG. 5B illustrates an end point routing table held by the v-router, according to an example embodiment.

FIG. 5C illustrates a VN topology description table held by the v-router, according to an example embodiment.

FIG. 5D illustrates a logical tunnel configuration table held by the v-router, according to an example embodiment.

FIG. 19 illustrates an embodiment of an apparatus in the network which is provided using a virtualization approach.

DETAILED DESCRIPTION

Figure 1A:
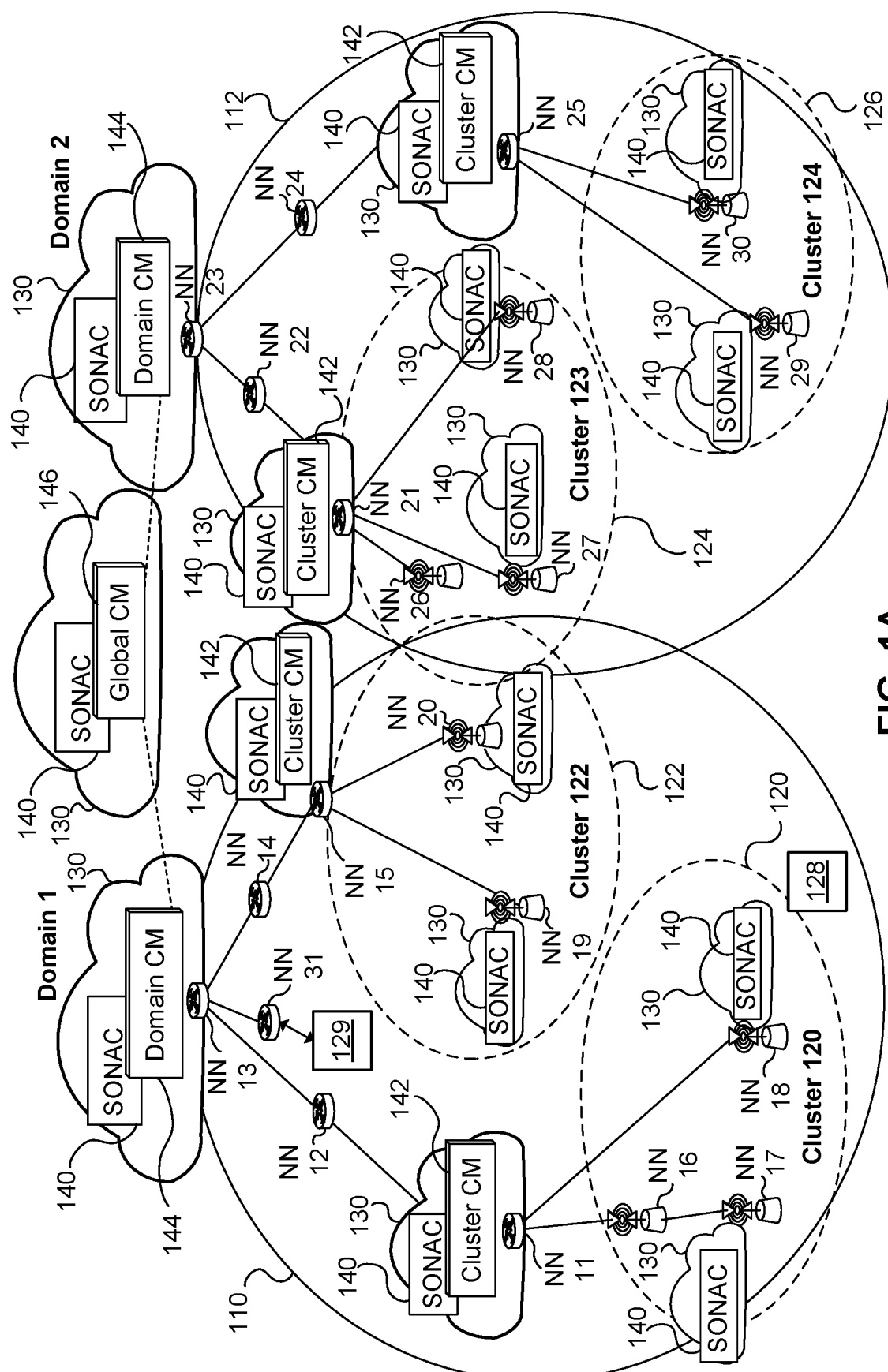
FIG. 1A illustrates a network which is configurable according to embodiments.

As used herein, a communication network (or simply a "network") refers to a collection of communicatively coupled devices which interoperate to facilitate communication between various end point devices, such as User Equipment devices. The term "User Equipment" (UE) is used herein for clarity to refer to end point devices which are configured to communicate with a network either via fixed line connection, or via radios operating according to a predetermined protocol. UEs include UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services as the device moves. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple end points that are connected to the network. A service may be provided by the network operator, or may be provided by network customer such as a business, utility, government, or other organization. Examples of services include, but are not limited to, providing audio and/or video content to stream or download to an end point such as a UE, storage and/or processing of data from an end point such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

As used herein, the term virtual network (VN) refers to a pre-configured network topology including a collection of pre-configured virtual network nodes which are communicatively interconnected to support one or more network slices. The VN is identified by a VN identifier (VN ID). If the VN supports a single network slice (i.e. a single service), that slice may also conveniently be identified by the VN ID. If the VN supports a plurality of network slices, a service identifier (service ID) may be used to differentiate between each of the supported plurality of network slices, to identify which slice is allocated to which service as supported by that VN. The plurality of network slices are logically separated from one another within the VN, but all of the network slices within a VN share a common set of network resources that have been configured for that VN. In this case, a slice can be identified using a combination of a VN ID and a service ID.

More particularly, a VN is composed of a collection of VN nodes each of which is associated with one of a corresponding collection of physical network nodes that make up the network. The VN nodes are communicatively interconnected, either directly or indirectly via other VN nodes. Each VN node is associated with, and communicatively linked to, a corresponding physical network node of the network. In some embodiments, operational capacities of the VN nodes may be co-located with their associated physical network node. In some embodiments, operational capacities of one or more of the VN nodes may be physically separated from their associated physical network node. The VN may further include definitions and functional elements to provide connecting tunnels, associated routing functions, packet aggregation functions, packet de-aggregation functions, firewall functions, anchor point functions, in-network processing elements, admission control, and access link scheduling and management, that is arranged to support the one or more network slices across the collection of VN nodes.

For example, the association may be such that a packet received at a physical network node is provided to the VN node associated with that physical network node for processing (e.g. under predetermined conditions), and packets provided by the VN node may be transmitted by the physical network node as instructed by the VN node, or the pre-configured rules for that VN. The VN nodes can be instantiated using computing, communication, and memory resources such as network function virtualization resources. These resources can be located in a cloud, such as a datacenter or local cloud. The local cloud may include generic hardware proximate or co-located with the associated network node. A VN node may comprise a network function or a group of network functions. The logical topology of a VN refers to the interconnection among multiple VN nodes which are distributed at various associated physical network nodes.

A VN tunnel refers to a logical communication link between two VN nodes. An open VN tunnel refers to a logical communication link between a VN node and another network node which is neither associated with a VN node nor a VN specific network function. The other network node may be, for instance, an edge node of the network, such as an access node or a gateway. Edge nodes provide connectivity for mobile or fixed end points (or "end nodes") to connect to the network. End points may include, for instance, UEs and other devices external to the network, such as application servers, which attach to the VN access the service(s) supported on that VN.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network.

Embodiments provide for delivery of one or more services from at least one network entity available on a network. Rather than the network acting only to connect end points to the network entity, the network is configured to participate in providing the service. In particular, a VN is instantiated and pre-configured on the network for providing delivery of the service(s). The VN is pre-configured in such a way that end points are able to connect to a desired service with limited to no signaling across the network at the time of service usage, and therefore limited latency. This is enabled by the pre-establishment of the VN on the network, which effectively extends the service from the network entity across the network to the point of attachment by the end point. Pre-configuration of edge nodes may also enable this feature. When the end point attaches to the VN, it gains access to the service, without signalling between the end point and the network entity that provides the service.

Because the network participates in service delivery, the service is expanded into the network by the use of virtual network nodes. The virtual network nodes can recognize incoming data packets associated the service and route them appropriately via the pre-established tunnels.

The pre-configured VN is operative to recognize incoming data packets associated the service and to route them appropriately via the pre-established tunnels. This operation is supported by VN routing functions (v-routers) and VN tunnels which are established for providing the service. The VN nodes can also perform other functions of the service such as packet aggregation and de-aggregation, firewall functions, anchor point functions, in-network processing and data storage, admission control, and access link scheduling and management. The v-routers are configured to route packets between the VN nodes via the tunnels, in a hop-by-hop manner. Packets are routed toward an appropriate destination, such as but not necessarily limited to a destination specified in the packet using a name identifier or explicit destination identifier. Physical network resources, such as network nodes, are configured to provide the VN tunnels as part of the VN tunnel definition. VN tunnels can be supported by a chain of physical network nodes which are configured to forward tunneled packets toward the VN tunnel egress. In some embodiments, each physical network node supporting a tunnel may be configured with a set of routing rules which associates a VN tunnel identifier or destination network node identifier with a next network node. When a packet specifies the VN tunnel identifier or destination network node identifier, it is forwarded to the associated next network node. Packets transmitted by the end point and received by the edge node may specify a name identifier which is separate from and independent of the destination's location. The name identifier is or refers to a substantially unique name or identification number of the destination device, which is tracked by entities operating in the network, such as CM and v-router entities.

For example, when the service involves processing of data transmitted by UEs in a certain manner, and providing results of this data processing to the UE or another UE, some or all of the processing may be done at virtual network nodes proximate to the network edge, thereby reducing service latency. The location of VN nodes performing in-network data processing and/or data caching can be selected based on criteria such as but not limited to: performance, cost, latency, communication overhead, and quality of service.

In various embodiments, the pre-configuration of the VN provides a network infrastructure that stands ready to handle packets according to a requested service. This allows end points to reduce signaling because the details of how the packet is to be treated are specified in advance when the VN is pre-configured. This also allows for lower latency, because tunnel set-up, service function set-up, end point tracking, etc. are performed in advance. Each VN node is in standby across the network ready to receive and handle any packets directed to a service supported by that VN. In addition, because service functions can be embedded in the network (even possibly at the edge nodes or in radio access network (RAN) clusters), data forwarding and associated latency and network resource usage can be reduced.

Network pre-configuration may be performed by a network entity referred to as a Service Oriented Network Auto Creation entity (SONAC). The SONAC is described for example in Zhang, Hang, et al., "5G Wireless Network: MyNET and SONAC", IEEE Network Volume: 29, Issue: 4, Jul.-Aug. 2015, pp 14 to 23, which is incorporated herein by reference. The SONAC may perform and/or direct underlying network resources to instantiate and configure the VN as described herein. As used herein, SONAC functionalities can be subdivided into functions used for network slice composition, referred to as SONAC-Com, and functionalities used for network slice operation, referred to as SONAC-Op. The SONAC may comprise operations for performing software-defined topology definition (SDT), software-defined resource allocation (SDRA), and software-defined protocol definition (SDP). SDT, SDRA and SDP in support of SONAC-Com and SONAC-Op are referred to as SDT-Com, SDRA-Com, SDP-Com, SDT-Op, SDRA-Op and SDP-Op, respectively. SONAC-Op may be dedicated to managing a single network slice, or common to multiple network slices managed thereby. SONAC-Op may be supported on its own network slice or on a network slice used to support multiple entities. The concept of network slices provides operators the flexibility to provide network infrastructure resources that may be tailored to satisfy the wide variety of customer service and quality requirements.

The present application describes a "Hop-On" concept which allows end-point devices (e.g. UE) to connect and disconnect from the slice (VN) directly, rather than needing to complete end-to-end connections as is presently the case. This significantly simplifies the data traffic delivery procedure and reduces signaling overhead and latency across the network. In the Hop-On VN traffic delivery system and method, access to a service does not require per-UE per-session establishment, and does not require end-to-end connection setup between the UE and the service provider. There is no session setup as the session is effectively "pre-existing" as a VN slice pre-established on the network. The VN slice supported by a pre-defined VN topology configured on the network. The UE only needs to negotiate its entry or exit from the slice which may occur at a localized level (e.g. at the edge of the VN). The connection between the slice access point and the service provider is established and maintained by the control functions managing the slice.

Slicing and Hop-On together enable:
  Scalability—Physical Network Nodes (NNs) are operative on the service level (integrated data traffic of a service), instead of on device/session level
  Simplicity—Per device/session end-to-end tunnel establishment is removed or minimized
  Flexibility—service-customized VN/slice—allows the communications network to be adjusted for individual services, to provide a best fit for the needs of customers and network operators For example, end-points of a VN designed for such services can hop-on the VN by sending data packets using a pre-assigned Access Link (AL) resource for that VN. The end-point UE can register and connect with a local node at the edge of the VN, rather than the destination end point of their communications. Once data packets for a service are submitted to the network, the packets are routed to the intended destination(s) along pre-defined VN tunnels, and can be separated by service or QoS as required. For VNs where there is no pre-assigned AL resource, a simplified set of signaling message exchanges on the AL may be used to enable data packet transmission over the AL. From the point of view of communicating devices, the network is always ready to receive and deliver data traffic.

Once the VN has been established, data traffic delivery to a mobile UE relies upon the selection of the right tunnel(s) when routing the data traffic, instead of the re-establishment of new per-device end-to-end connections. Accordingly end points, such as UE or business customers, are able to exchange traffic with a local NN without regard for the location of the intended recipient, or the condition of the network between the sender and the recipient. Similarly, NNs located logically distant from the destination end point do not need to know the logical or physical address of the destination end point. Instead, these NNs need only follow the pre-defined rules for handling packets and direct the packets to an assigned NN that is operative to maintain or obtain the current location of the destination end point.

When communicating to mobile UE, one or more tunnels connecting Access Points (APs) of a Radio Access Network (RAN) cluster can be selected by a v-router at the cluster level to selectively enable data delivery to the one or more APs. Accordingly, the decision-making regarding the best mode to reach a recipient UE may be decided at the lowest level which has the most accurate position and mobility information related to the recipient UE. With this functionality, true handover-free service access is enabled. The end-points of the communication can communicate with a correspondent party using a name (UE ID and a service ID) in place of location information. The hierarchical VN architecture enables the v-routers to handle the traffic on an end-point name basis, and access name-based location tracking and resolution from the CM's configured for that VN.

By using a pre-defined VN, data packets from specific applications, such as peer-to-peer communication (e.g. wechat), can be directly routed to the destination end point via efficient tunnel routing, i.e., shortest route without going through un-necessary paths. CM techniques provide the location information to VN routers to enable the efficient data delivery.

From the endpoint (e.g. UE or server) perspective, the hop-on process starts with network registration: to obtain authentication and authorization to use the network, followed by registration to a CM slice to start reach-ability operation to enable the network to track the endpoint's location. The location tracking may be initiated before the endpoint is registered to a user plane (UP) of the VN (slice). The next step is registration to a UP slice to authorize the endpoint to use the UP slice and obtain information on any requirements for admission control (AC) for follow-up service data transmission. If no further AC is required, the end-point can Hop-On, or access, the slice to directly send data over the VN. For most MTC cases, the above procedure can be simplified. If further AC is required for a service, before sending any data traffic an AC procedure is needed (e.g. for some bulk data transmission over a slice with limited VN capacity, an AC is needed before access is provided to the slice).

Embodiments relate to the interactions between an end point, such as a UE, computing device, or customer server, and an edge node, such as an access point of a radio access portion of a communication network. In some embodiments, the end point may be a server or other networked device, and the corresponding edge node may be a gateway of the communication network. Some embodiments provide for an end point or method of operating same, while other embodiments provide for an edge node or method of operating same. The interaction between edge nodes and end points supports VN operation, so as to allow end points to access the VN and to convey packets between the end points and the VN.

FIG. 1A illustrates an example of a network infrastructure which may be configured and utilized according to some embodiments. It should be understood that this network infrastructure and its topology is used as an example only, and is not intended to limit the present invention.

To assist with tracking the location of UE accessing the network, the network can be divided into domains, such as Domain 1 110 and Domain 2 112 illustrated in FIG. 1A. Each domain may be further sub-divided into RAN clusters 120, 122, 123, 124. For expediency, FIG. 1A illustrates two domains and two hierarchical layers, namely a domain layer and a cluster layer, however other embodiments may include various numbers of domains and more or fewer layers, as may be applicable for a particular network. The specific domain division and sub-division may be implementation-specific and based on network requirements.

FIG. 1A illustrates multiple physical network nodes (NNs) labelled NN 11 to NN 30. FIG. 1A further illustrates multiple network entities which are provided in the form of VN functions supported by computing resources 130. The network entities 140, 142, 144, 146 are instantiated using the computing resources 130 such as reconfigurable in-network resources, or cloud or datacenter resources. The computing resources 130 may comprise, for instance, a data center, server, or virtualized cloud resources available to particular NNs. Generally, VN nodes are associated with a corresponding computing resource 130, and accordingly physical nodes that are not allocated computing resources 130 would not be allocated as VN nodes.

The illustrated network entities include SONAC entities 140 and CM entities including cluster CM entities 142, domain CM entities 144 and a global CM entity 146. Each network entity 140 to 144 may associate with the network node at which it is located. The global CM entity 146 may associate with another network node (not shown), or may be supported as a separate management node that manages and directs operations in the two Domains 110, 112.

The SONAC architecture formed of SONAC entities 140 is used for pre-configuring and managing VNs which include VN nodes associated with at least some of the network nodes. The SONAC may also manage operations of the physical network nodes NN 11 to NN 30. The interconnections between SONAC entities at different layers of the architecture are not shown for the sake of clarity. SONAC-Com functions supported by the SONAC entities 140 and CM functions supported by the CM entities 142, 144, 146 can be pre-realized before any service slice is defined and implemented. SONAC-Op can be pre-realized if it controls and manages all slice operations. Alternatively, a SONAC-Op can be created together with a service slice if the SONAC-OP is dedicated to that service slice.

The network infrastructure further includes a hierarchical connectivity management (CM) entity formed of CM entities 142, 144, 146. The interconnections between CM entities at different layers of the architecture are not shown for the sake of clarity. The CM entity may be configured to track current locations of end points such as UEs, and to provide such location information to network nodes and/or SONAC components as required.

The network infrastructure further includes RAN clusters 120, 122, 123, 124, which include multiple radio access network nodes ("access nodes") in a common area. The access nodes in the RAN cluster are interconnected via wired or wireless communication links. Alternatively, at least some access nodes may be provided in a non-clustered configuration. The access nodes may each include their own full or partial baseband processing infrastructure, and some or all of the baseband processing infrastructure may be shared by multiple access nodes. The access nodes may be provided with or without computing resources 130, or may share a set of computing resources 130 made available to multiple access nodes. RAN clusters can be used as part of the VN. Further, packets may in some cases be wirelessly transmitted to and from RAN clusters using multipath, multicast or broadcast transmissions.

Network node NN 31 is illustrated as an example of an edge node which is not part of a RAN cluster. NN 31 may be, for example, a gateway which is connected to the Internet or another external communication network. Further illustrated is an end point 128 such as a UE which wirelessly communicates with one or more of the edge nodes NN 16, NN 17 and NN 18 in RAN cluster 120. Further illustrated is an end point 129 such as a server, which communicates with the edge node NN 31, for example via the external network. Due to mobility, end point 128 may enter cluster 122 and connect to one or more associated edge nodes, such as NN 19 and/or NN 20.

Figure 1B:
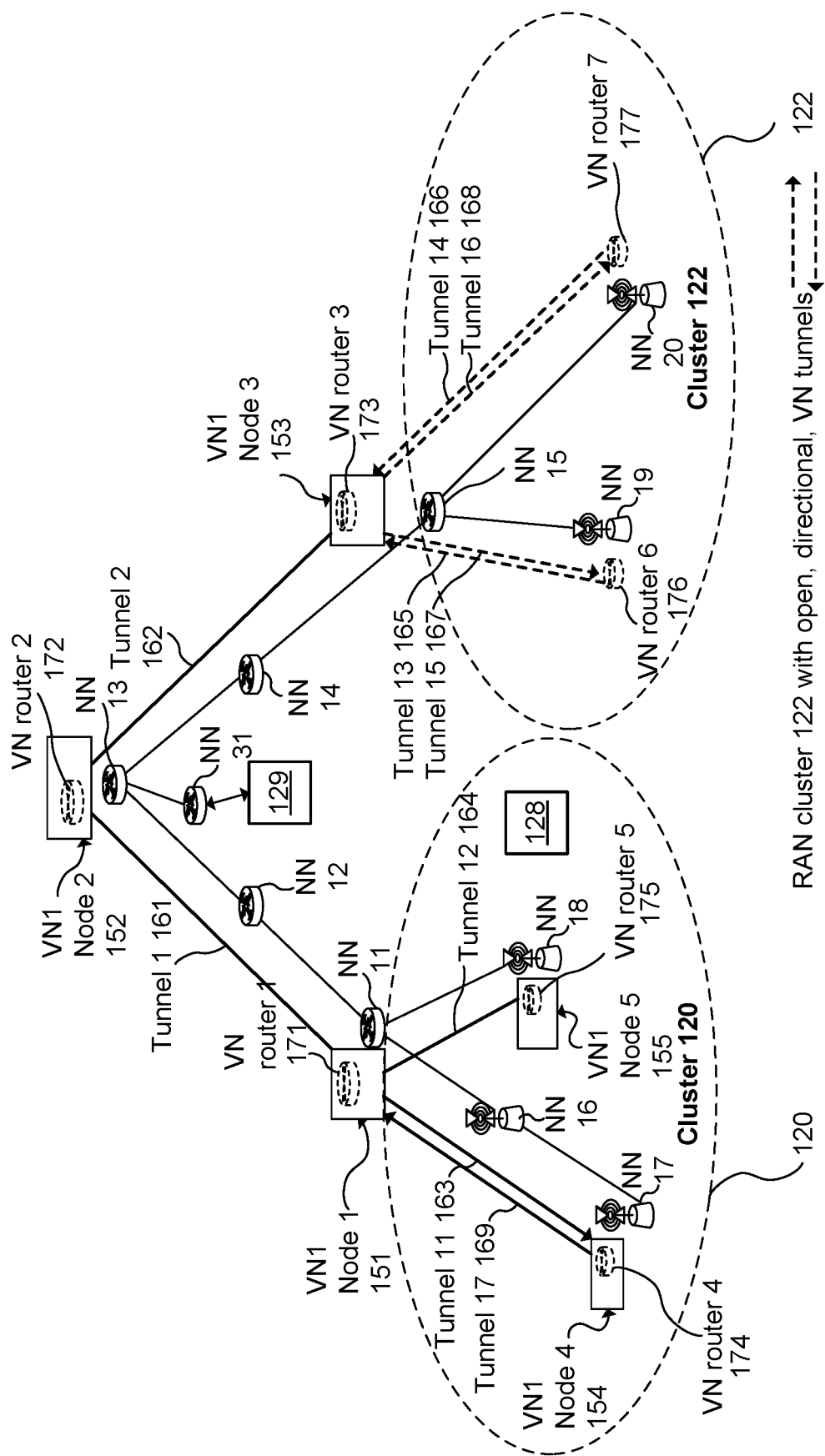
FIG. 1B illustrates configuration of a network according to embodiments.

FIG. 1B, illustrates a VN having VN ID equal to one. This VN is referred to as VN1, to illustrate that multiple VNs may be supported. VN1 Nodes 1 to 5 151, 152, 153, 154, 155 are each associated with a corresponding one of the NNs. For instance, VN1 Node 1 151 associates with NN 11 and cluster 120, VN1 Node 2 152 associates with NN 13 and may further be assigned a cluster ID of 121 to indicate that it is outside of both cluster 120 and cluster 122, VN1 Node 3 153 associates with NN 15 and cluster 12, VN1 Node 4 154 associates with NN 17 (an access node) and cluster 122, and VN1 Node 5 155 associates with NN 18 (an access node) and cluster 120. The VN logical topology, including VN nodes and VN tunnels, is illustrated on top of the network infrastructure of physical network nodes and communication links.

VN tunnels 161, 162, 163, 164, 165, 166, 167, 168, 169 connect VN1 Nodes 1 to 5 151, 152, 153, 154, 155. For instance, tunnel 1 161 has an ingress at VN1 Node 2 152 and an egress at VN1 Node 1 151, tunnel 2 162 has an ingress at VN1 Node 2 152 and an egress at VN1 Node 3 153, tunnel 11 163 has an ingress at VN1 Node 1 151 and an egress at VN1 Node 4 154, and tunnel 12 164 has an ingress at VN1 Node 1 151 and an egress at VN1 Node 5 155. VN tunnels may be bi-directional, such as tunnel 1 161, or uni-directional, such as tunnel 11 163.

V-routers 1 to 5 171, 172, 173, 174, 175 are instantiated and each associated with one of VN1 nodes 1 to 5 151, 152,

153, 154, 155. V-routers 6 & 7 176, 177 and labelled as "VN routers 6 and 7" are instantiated and associated with network nodes NN 19 and NN 20, respectively. The v-routers may be instantiated using cloud-based or datacenter-based resources, for example. In some embodiments, v-routers may be instantiated at least partially using resources which are co-located with the physical network nodes.

The VN may support at least one service slice. In cases where a plurality of service slices are supported, an additional service identifier (service ID) may be used to differentiate between service slices handled by that VN. In the case where only one service slice is supported by the VN, then the service identifier can be omitted as the VN ID inherently identifies the service slice supported by that VN. End points are able to reduce signaling, because rather than specifying details of how the packet is to be treated, the service identifier (e.g. derived from packet characteristics) is used to trigger packet handling according to the service. This also allows for lower latency, because tunnel set-up, service function set-up, end point tracking infrastructure establishment, etc. are performed in advance, such that end points know handle to traffic directed toward a specified service. In addition, because service functions can be embedded in the network (even possibly at the edge nodes or in RAN clusters), data forwarding and associated latency and network resource usage can be reduced.

Figure 2:
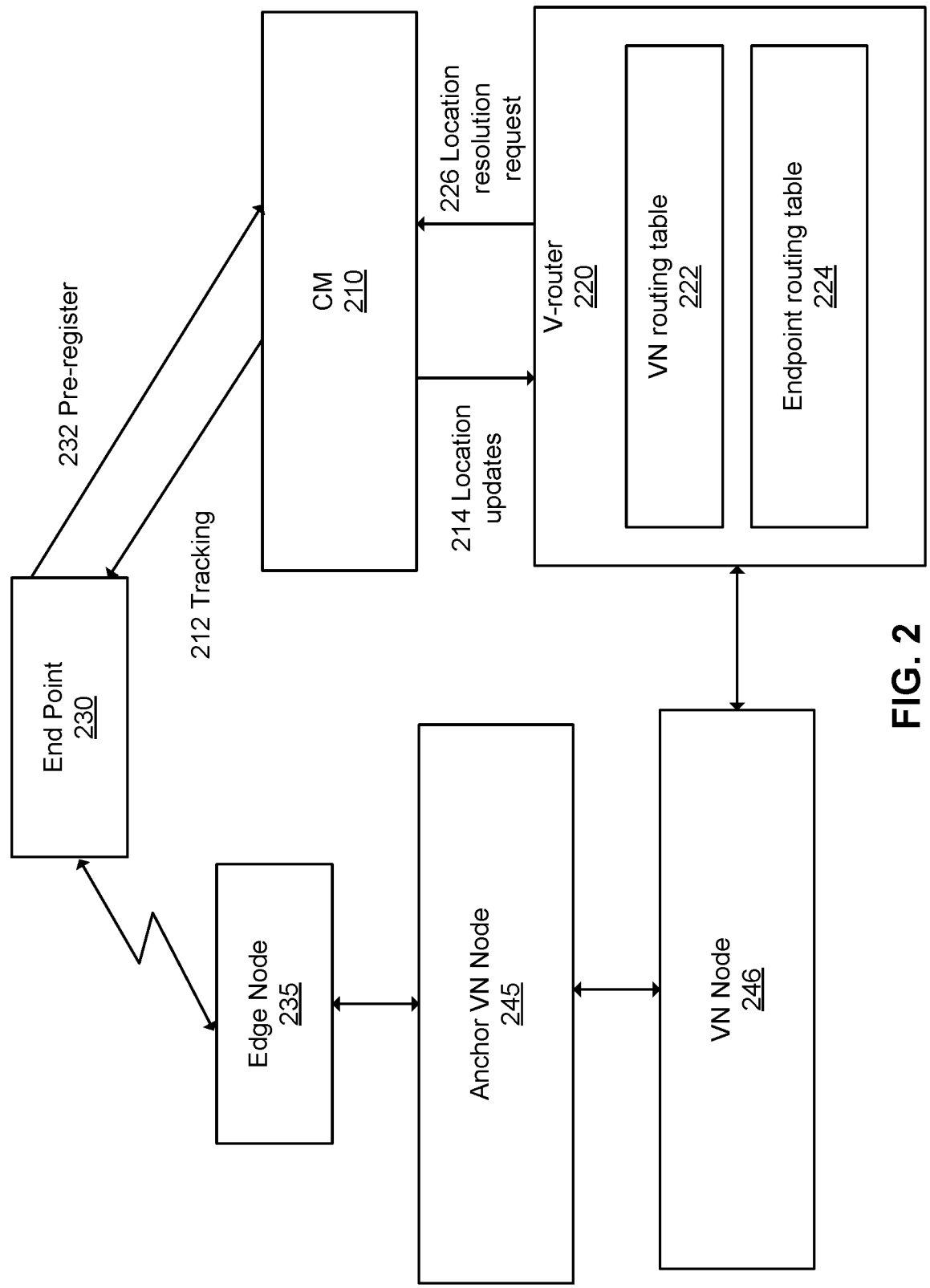
FIG. 2 illustrates interaction between an end point, a connection management entity, and a virtual router of a virtual network, according to embodiments.

Embodiments provide for a method and apparatus for forwarding packets toward a specified destination node via a virtual network. The packets may be associated with a service supported by the virtual network. FIG. 2 illustrates interaction of a connectivity manager (CM) 210, a v-router 220 and an end point 230, according to embodiments. The end point 230 may be a UE or a server which communicates with a physical network via an edge node 235. The physical network includes a plurality of interconnected physical nodes, and a subset of the physical nodes are associated with VN nodes, each of the VN nodes including a respective v-router. The end point 230 may be mobile, and thus may communicate with the network via different edge nodes over time.

The end point 230 pre-registers 232 with the CM 210 prior to requesting access to the service. The pre-registration triggers tracking 212 of the end point 230 by the CM 210. Pre-registration and tracking are mediated by the communication network infrastructure. The tracking operation includes tracking location and optionally also activity of the end point 230. As such, the end point location may be tracked prior to its registration with a service or VN and/or user plane network slice supporting the service. The end point location may be represented for example by a RAN cluster which is currently usable to communicate with the end point, or a VN node which is currently usable to communicate with the end point via an edge node and/or RAN cluster. Such a VN node is referred to as an anchor node. The tracking operation may include a reachability operation which interacts with the end point 230 to allow the CM to determine the location of either of the endpoints. As noted above, this may include the CM receiving location information from the end points, or it can include other techniques such as receiving an indication from nodes connected to the end points that the end point has disconnected, or connected. The location information can be provided in context with the topology of the VN, or it may be provided in absolute terms (e.g. a GPS location) that can be mapped to the network topology.

As part of the tracking operation, the CM 210 provides location updates 214 to v-routers, including the v-router 220, indicative of the current location of the end point 230. The location updates may be provided in response to one or more triggers, such as: receipt of a location resolution request 226 by a v-router, a timer or scheduling trigger, or a mobility event of the end point. A combination of triggers may be utilized.

Different trigger conditions may be used for different v-routers. For example, v-routers close to the network edge may receive location updates upon movement of the end point 230 between access nodes or RAN clusters, while v-routers further from the edge network may receive location updates only upon movement of the end point 230 between domains. In some embodiments, the triggers for providing location updates to a given v-router may be configured such that the v-router tends to receive location updates for an end point 230 only when such location updates will change the VN tunnel used by the v-router to route packets toward the end point 230. For example, provision of location updates to the v-router may be inhibited when such location updates will not change the VN tunnel (having ingress at the VN node hosting the v-router) used by the v-router to transmit packets toward the end point.

The CM 210 may include multiple CM components, one or more of which is operatively coupled to a given v-router. The CM components may be organized in a manner which reflects the VN topology. For example, the CM components may be organized in a hierarchical structure. In one embodiment, each VN node may include or be associated with a different CM component. CM components are operatively coupled together and share information such as end point location information.

A hierarchical structure may be used when the VN exhibits a tree-like topology such as is illustrated in FIG. 1A. CM components are associated with each of a plurality of network nodes, including NN 11, NN 13, NN 15, NN 21, NN 23 and NN 25. Such network nodes are associated with VN nodes for example as illustrated in FIG. 1B. A global CM component 146 is provided at the top of the hierarchy, two domain-level CM components 144 are provided below the global CM component 146 in the hierarchy, and four cluster-level CM components 142 are provided below the domain-level CM components 144. The interconnections between CM components, by which location information is propagated, are not shown in FIG. 1A. The CM may be instantiated prior to definition of one or more VNs which are to be supported by same. The CM may support multiple VNs and/or multiple services.

The CM may be provided in a dedicated network slice, referred to as a CM slice, or in a network slice which houses a variety of control and/or management functions. Associations between particular v-routers and particular CM entities and/or CM components of a CM entity may be defined by SDT-Com or SDT-Op. The association may be made by providing one or both of a CM and a v-router with an identifier of a v-router and a CM, respectively.

The v-router 220 operates to route data packets toward the end point 230. The packets are routed toward the end point via VN tunnels, based on the current location of the end point 230 as indicated to the v-router via the location updates 214. The routing path to the end point may include other VN nodes and associated v-routers, as well as an edge node 235 or RAN cluster of multiple edge nodes communicatively coupled to the end point 230.

In some embodiments, the v-router 220 includes at least a VN routing table 222 and an end point routing table 224. Tables refer to data stored in computer memory which associates input data to output data, whether or not in tabular form. In many embodiments, the VN routing table 222 is relatively static, and may be created during VN instantiation for example by SDT-Com. The VN routing table specifies associations between other VN nodes reachable from the v-router 220 and VN tunnels (having ingress at the VN node hosting the v-router) to be used for routing packets toward such VN nodes. The end point routing table 224 is dynamic, such that entries thereof are created and updated according to the location updates 214 provided by the CM 210. The end point routing table specifies associations between end points reachable from the v-router 220 and anchor VN nodes currently usable to reach these end points. After an end point registers to the VN, it can be associated with a VN node which acts as an anchor node of the end point in the VN. As such, when a packet designating the end point 220 as destination is received at the v-router 220, the v-router consults the end point routing table 224 to determine the anchor VN node 245 currently associated with the end point 220. The v-router then consults the VN routing table 222 to determine the VN tunnel to use to reach the anchor VN node 245. The v-router then forwards the packet toward the anchor VN node 245 through its associated VN node 246 via the determined VN tunnel. As will be appreciated, the packet may pass through a plurality of VN nodes 246 on its transmission to its destination anchor VN node 245. Upon receipt of the packet, the anchor VN node may forward the packet on to the end point, for example via an associated edge node or RAN cluster.

In various embodiments, the v-routers associated with VN nodes of the VN are required to identify the next logical tunnel (or next VN node) to which to submit a data packet after receipt and processing by the VN nodes. This identification utilizes an end point routing table at each v-router. For fixed end points, the table can be obtained after end point initial location registration. For mobile end points, a v-router acquires location information from its associated CM entities and updates the end point routing table based on same. Based on the destination name (or ID) and the acquired location information, a v-router will route the data packet to the appropriate next logical tunnel. The VN thus forwards data tunnel by tunnel over the VN until the data packet reaches its destination.

In some embodiments, each v-router may consult its end point routing table to determine an anchor VN node. In other embodiments, once the anchor VN node is determined by one VN node, it may be specified in the packet and re-used by one or more subsequent VN nodes on a limited basis. Re-use may cease (and an end point routing table consulted again) for example after expiry of a timer, after a predetermined number of hops, or upon determining that the end point is no longer reachable via the anchor VN node.

Figure 3A:
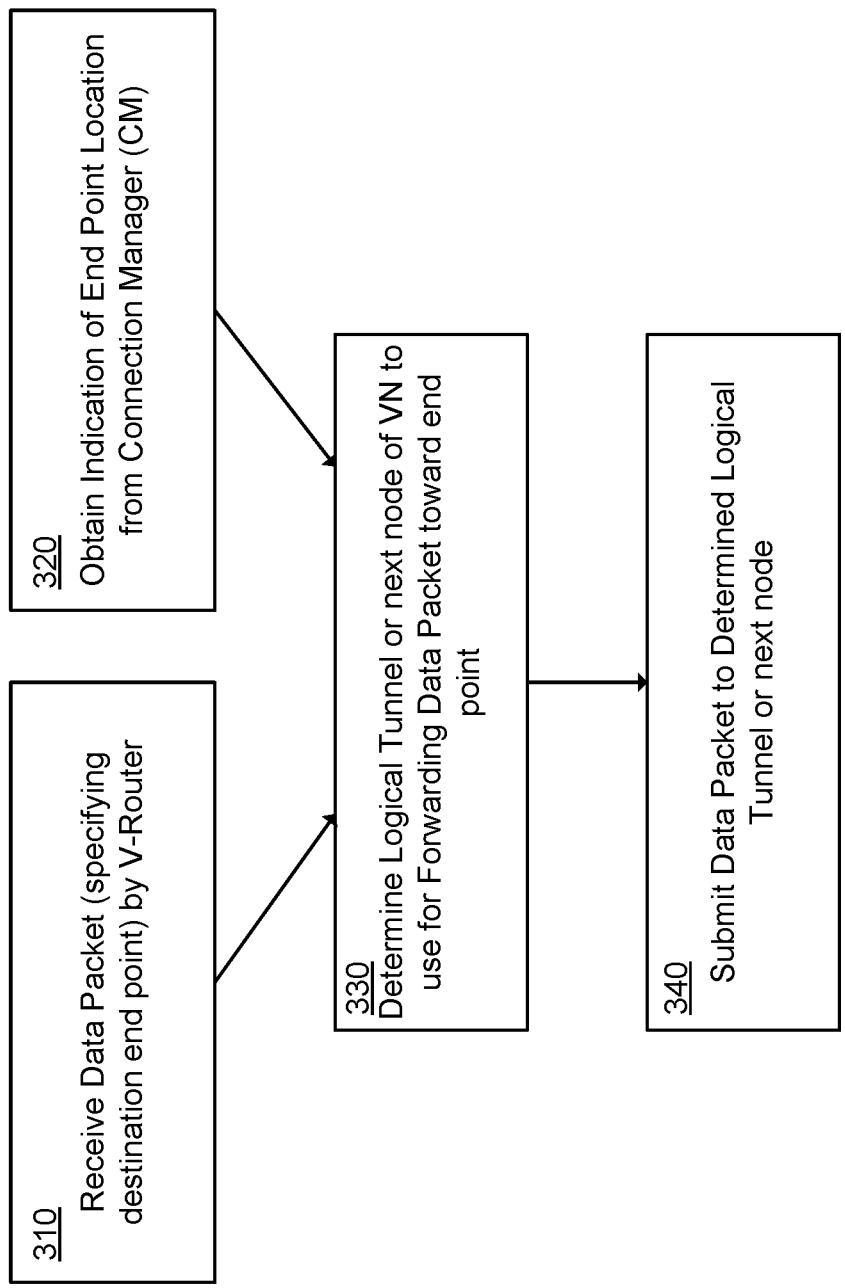
FIG. 3A illustrates operation of a virtual router of a virtual network, according to embodiments.

In view of the above, embodiments provide for operation of a v-router at a VN node to route data packets to an end point in accordance with a service supported by the VN. Having reference to FIG. 3A, the operation comprises receiving 310 a data packet by the v-router, the data packet associated with the VN and specifying the end point as its destination. The operation further comprises obtaining 320 an indication of location of the end point, the end point location being tracked by a CM and the CM providing the indication of location to the v-router. The operation further comprises determining 330 a logical tunnel, or a next VN node, of the VN for use in forwarding the data packet toward the end point, based at least in part on the obtained indication of location of the end point. The operation further comprises submitting 340 the data packet to the determined logical tunnel or next VN node for forwarding toward the end point, i.e. forwarding the data packet via the logical tunnel.

Figure 3B:
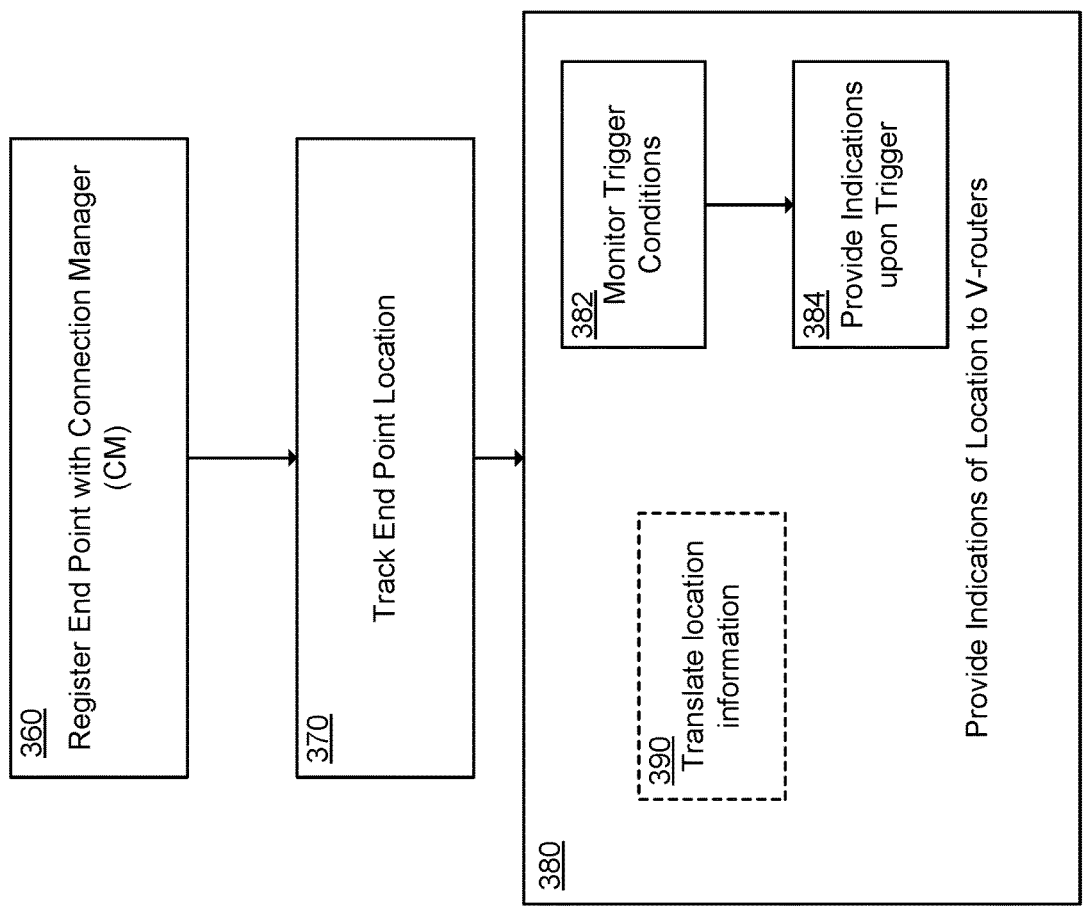
FIG. 3B illustrates operation of a CM entity of a virtual network, according to embodiments.

Further in view of the above, embodiments provide for operation of a CM entity to maintain routability of data packets to an end point, in accordance with a service supported by a VN which is in turn supported by the CM. Having reference to FIG. 3B, the operation comprises, following registration 360 of an end point with the CM entity, tracking 370 the location of the end point and providing 380 indications of the location to one or more v-routers of the VN. The v-routers use the indications of location to route data packets to the end point. The CM can monitor 382 one or more trigger conditions, such as timer expiries, boundary-crossing events by the end point and/or location resolution requests by the v-routers, and provide 384 the indications in response to satisfaction of the monitored trigger conditions. The CM can translate 390 between reported end point location information, such as a geographic location or edge node or RAN cluster to which the end point associates, and VN-based location information, such as an anchor VN node which is usable to route packets to the end point.

Figure 4A:
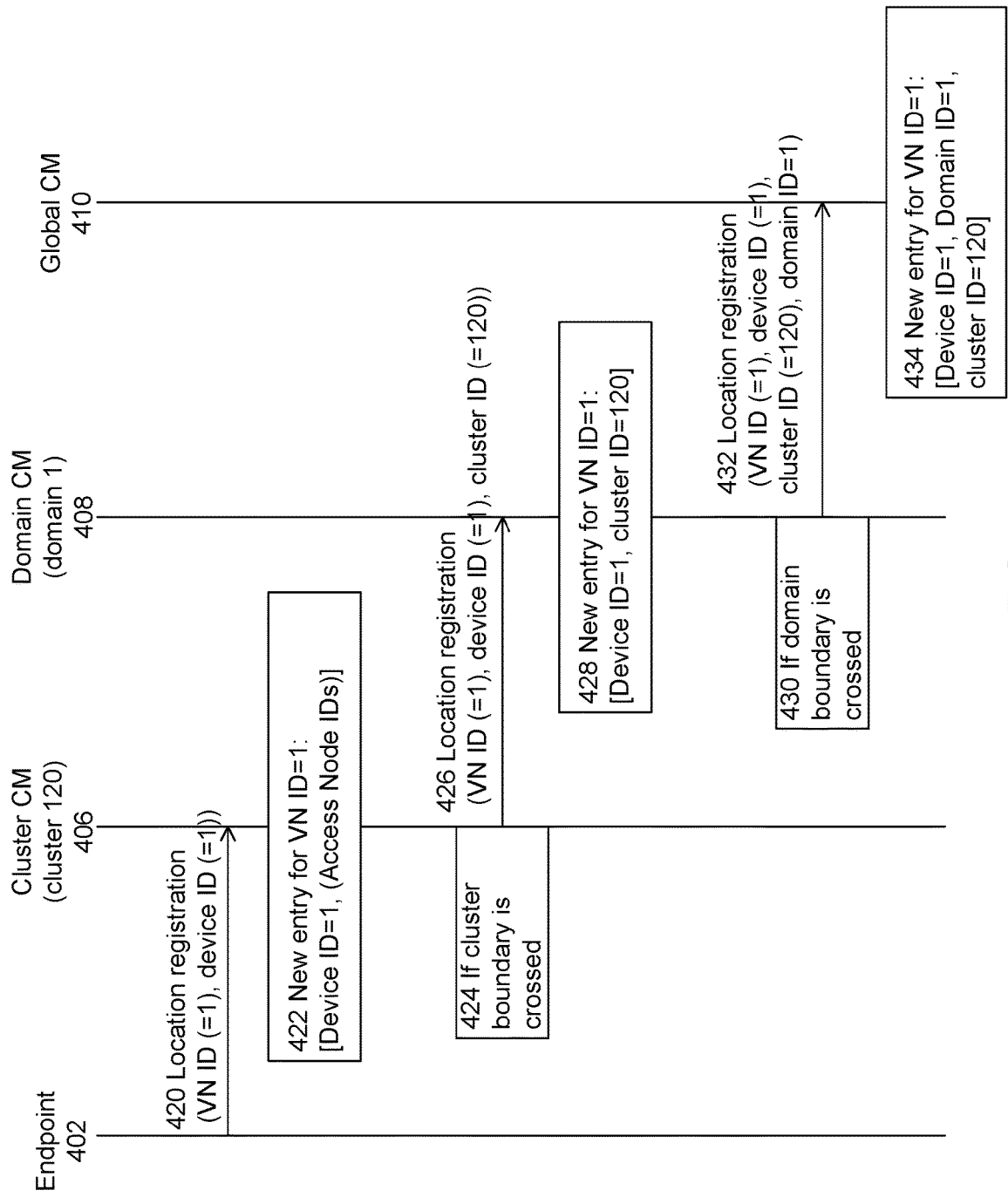
FIG. 4A illustrates end point location tracking with a CM entity, according to embodiments.

FIG. 4A illustrates end point location tracking with a CM entity, according to an embodiment. Device name identifier (or name ID) based location tracking using the hierarchical CM architecture of FIG. 1A is used for purposes of illustration in FIG. 4A. The end point is assumed to communicate with RAN cluster 120.

In more detail, the end point 402 transmits 420 a location registration message to the cluster CM 406 of RAN cluster 120. The location registration message specifies a VN with respect to which the end point is operating and an end point name identifier (e.g. the device ID). The cluster CM 406 creates 422 a new entry in its registration table, saving this information along with identities of one or more edge nodes which are communicatively linked to the end point. The cluster CM 406 also determines 424 whether the end point 402 has crossed a cluster boundary. This may be determined for example by checking whether the last registration of the end point was with the cluster CM, for example as evidenced by a recent prior entry in the cluster CM registration table in relation to the end point 402. If the end point 402 is determined 424 to have crossed a cluster boundary, the cluster CM 406 transmits 426 a location registration message to the domain CM 408. This location registration message is similar to the location registration message provided to the cluster CM, but further includes the cluster ID. The domain CM 408 repeats the process. The domain CM 408 creates 428 a new entry in its registration table, saving the location registration message information, e.g. in association with the device ID. The domain CM 408 also determines 430 whether the end point 402 has crossed a domain boundary. If the end point 402 is determined 430 to have crossed a domain boundary, the domain CM 408 transmits 432 a location registration message to the global CM 410. This location registration message is similar to the location registration message provided to the domain CM, but further includes the domain ID. The global CM 410 creates 434 a new entry in its registration table, saving the location registration message information. By this operation, the end point 402 registers its current location with the CM. This process is repeated for example periodically or whenever the end point 402 has potentially moved.

In some embodiments, when a cluster or domain boundary is crossed as determined above, the cluster CM 406 or domain CM 408 also transmits location updates to one or more v-routers, in particular those v-routers which will have their routing operations affected by the boundary crossing.

The location registration procedure illustrated in FIG. 4A is an example in which end point explicit location registration is performed. Alternatively, the location registration procedure can be implicit. For example, an end point may only report downlink measurement reports to the cluster CM, or the end point may only send an uplink sequence which is received by edge nodes configured to monitor this sequence report. The edge nodes can determine an uplink signal strength based on the received signal strength (assuming that the end point transmits with a known strength). This measurement of signal strength can be forwarded to the cluster CM. A cluster CM can be configured to maintain the information of candidate set of access nodes (tunnels) for a device which actively receiving data from network.

In some embodiments, in addition or alternatively to the CM components maintaining location registration tables as in FIG. 4A, one or more CM components may maintain end point routing tables. End point routing table entries can then be provided to v-routers in place of location information. In this case, the creation 422, 428, 434 of new entries at CM components can refer to the creation of new routing table entries. A v-router may then directly use the end point routing tables as maintained by its associated CM component, or the v-router may retrieve entries of this routing table in order to main its own local copy of the routing table. The routing table entry maintained by the CM can include: an end point name identifier, a destination (anchor) VN node associated with the end point, and, in some embodiments, a next VN node to which to forward packets specifying the end point as destination.

Figure 4B:
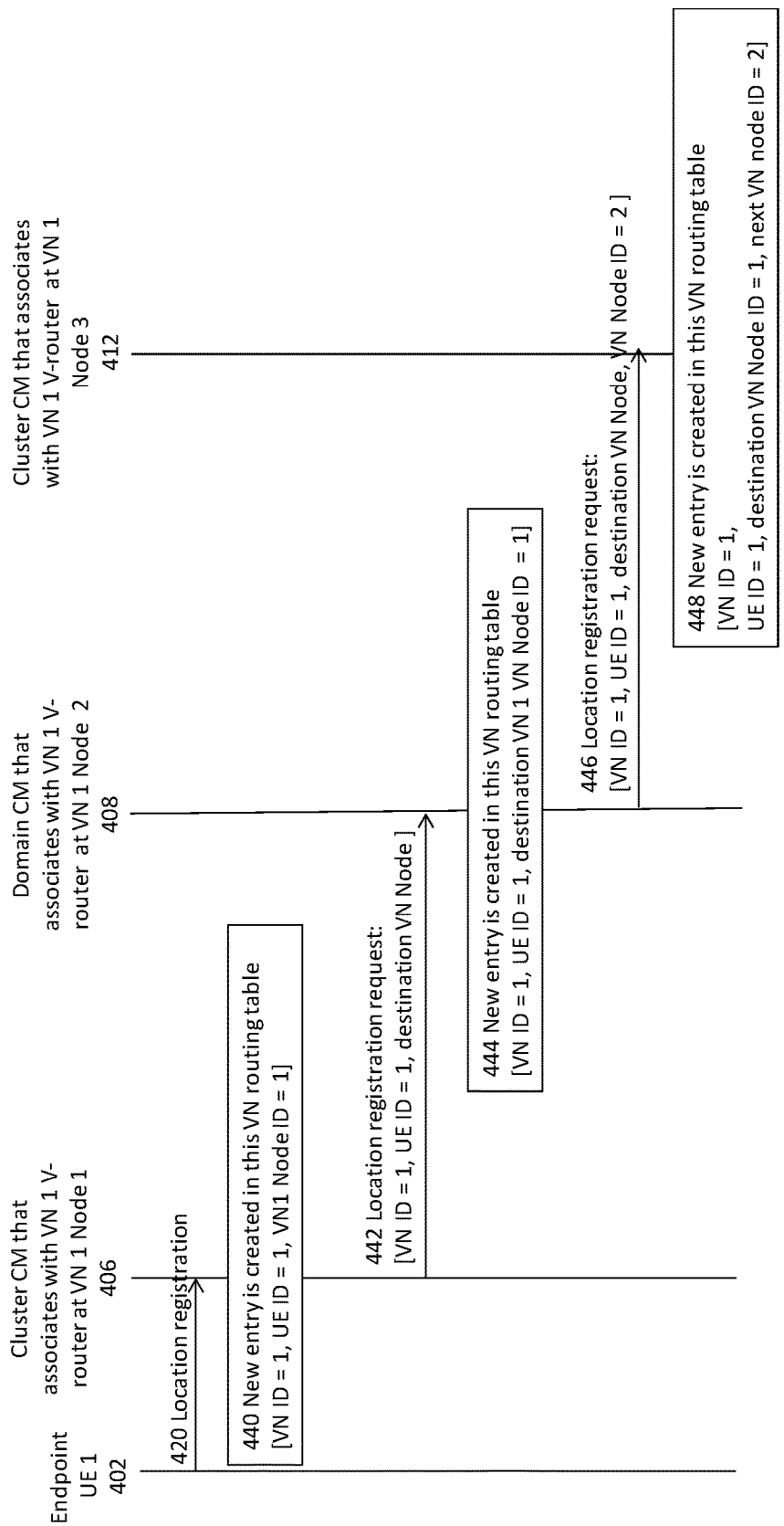
FIG. 4B illustrates end point location tracking where a CM entity maintains routing tables, according to embodiments.

FIG. 4B illustrates an example of the above-mentioned embodiment, namely in which the CM components maintain routing tables. Upon receipt of the location registration message 420, the cluster CM 406 creates 440 a new routing table entry in a routing table managed thereby. In an embodiment, the cluster CM 406 is an instance of the cluster CM 142 which associates with v-router 171 of VN1 at VN1 node 1 151 (as illustrated in FIGS. 1A and 1B). In an embodiment, the new routing table entry includes the VN ID, the end point name identifier, and the identity of the node of VN1 which is used to reach the end point 402. As such, in this embodiment VN1 node 1 151 may be considered an anchor node for the end point 402.

The cluster CM may then transmit 442 a location registration request message to the domain CM 408, the message including the VN ID, end point name identifier, and destination (anchor) VN node ID. The message 442 may be transmitted on an as-needed basis, for example on determining that the end point 402 is newly registered or has crossed a cluster boundary. In an embodiment, upon receipt of the location registration request message 442, the domain CM 408 creates 444 a new routing table entry in a routing table managed thereby. The domain CM 408 is an instance of the domain CM 144 which associates with v-router 172 of VN1 at VN1 node 2 152 (as illustrated in FIGS. 1A and 1B). In an embodiment, the new routing table entry again includes the VN ID, the end point name identifier, and the identity of the node of VN1 which is used to reach the end point 402.

The domain CM may then transmit 446 a location registration request message to another cluster CM 412, the message including the VN ID, end point name identifier, and destination (anchor) VN node ID. The message 446 may be transmitted on an as-needed basis. Upon receipt of the location registration message 442, the cluster CM 412 creates 448 a new routing table entry in a routing table managed thereby. In an embodiment, the cluster CM 412 is an instance of the cluster CM 142 which associates with v-router 173 of VN1 at VN1 node 3 153 (as illustrated in FIGS. 1A and 1B). In an embodiment, the new routing table entry again includes the VN ID, the end point name identifier, and the identity of the node of VN1 which is used to reach the end point 402. In an embodiment, the new routing table entry also includes a next VN node ID, indicative of a next VN node to forward packets to when such packets specify end point 402 as destination. A similar location registration message may be transmitted to the global CM.

Figure 4C:
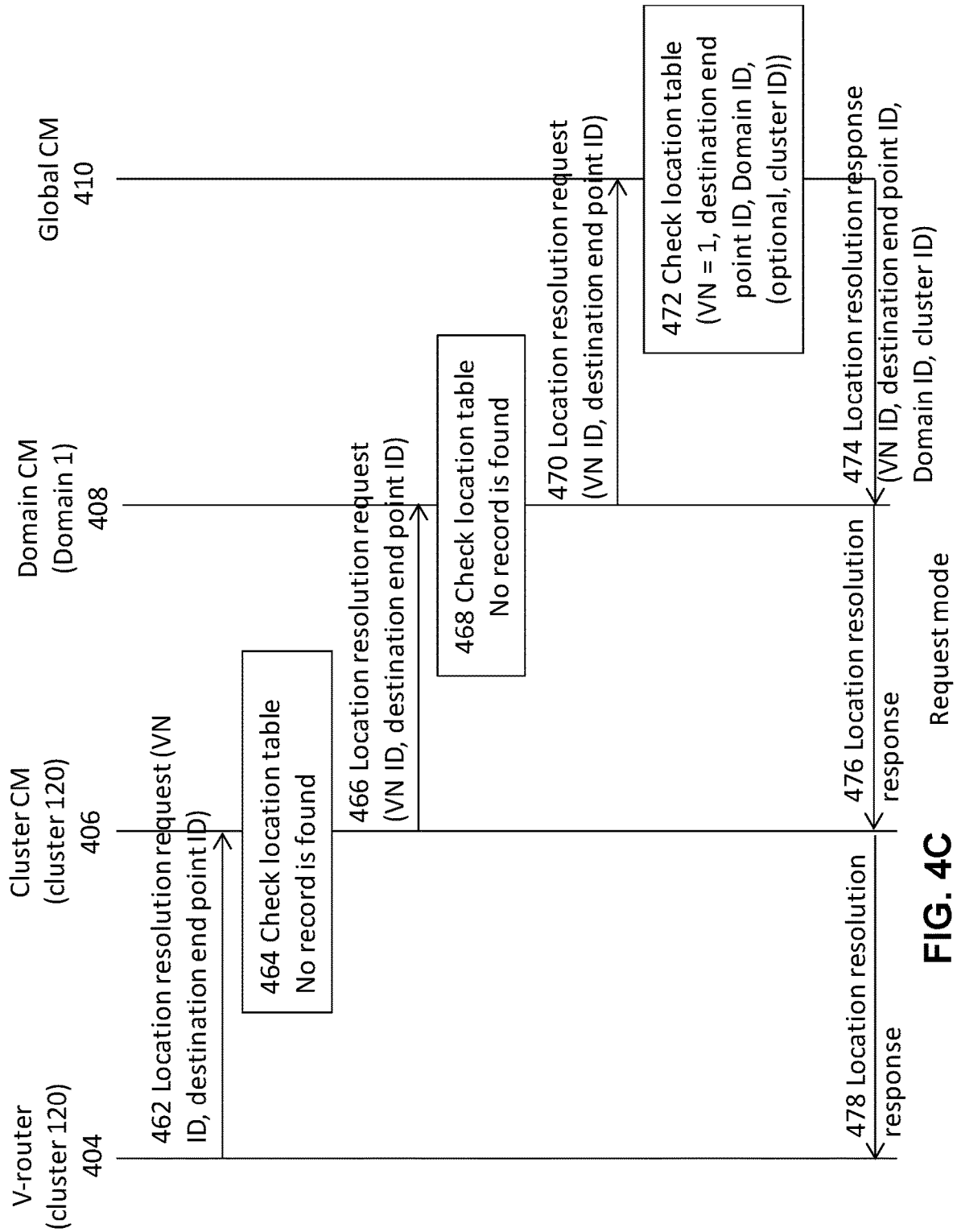
FIG. 4C illustrates interaction between a v-router and a CM, according to embodiments.

FIG. 4C illustrates interaction between a v-router and a CM, including satisfaction of a location resolution request, according to an embodiment. This operation corresponds to a request mode, in which a v-router contacts its associated CM to obtain location information, for example upon determining a need for this location information. The v-router 404 (in the present example belonging to cluster 120), transmits 462 a location resolution request specifying an end point to the cluster CM 406 of cluster 120. The cluster CM 406 checks 464 its location registration table. If an entry is found for the end point, a location resolution response is returned to the v-router 404. Otherwise, as illustrated, the cluster CM 406 transmits 466 the location resolution request to the next-higher-level CM component in the hierarchy, namely the domain CM 408. (In the example of FIG. 4C, it is assumed that only the global CM registration table has an entry for the end point.)

The domain CM 408 checks 468 its location registration table. If an entry is found for the end point, a location resolution response is returned to the cluster CM 406 and subsequently to the v-router 404. Otherwise, as illustrated, the domain CM 408 transmits 470 the location resolution request to the next-higher-level CM component in the hierarchy, namely the global CM 410. The global CM 410 checks 472 its location registration table and locates the corresponding location entry for that end point device name ID. A location resolution response is then returned 474 to the domain CM 408 which in turn returns a location resolution response 476 to the cluster CM 406, which in turn returns a location resolution response 476 to the v-router 404 including a location identifier and the name ID.

In various embodiments, when the cluster CM 406 or the domain CM 408 receives a location resolution response 474, 476, it may store the included location information in its location registration table. Such operation tends to cache location information toward lower levels of the CM hierarchy in response to higher location request frequency. The location resolution response 478 may also be forwarded to the V-router 404.

Figure 4D:
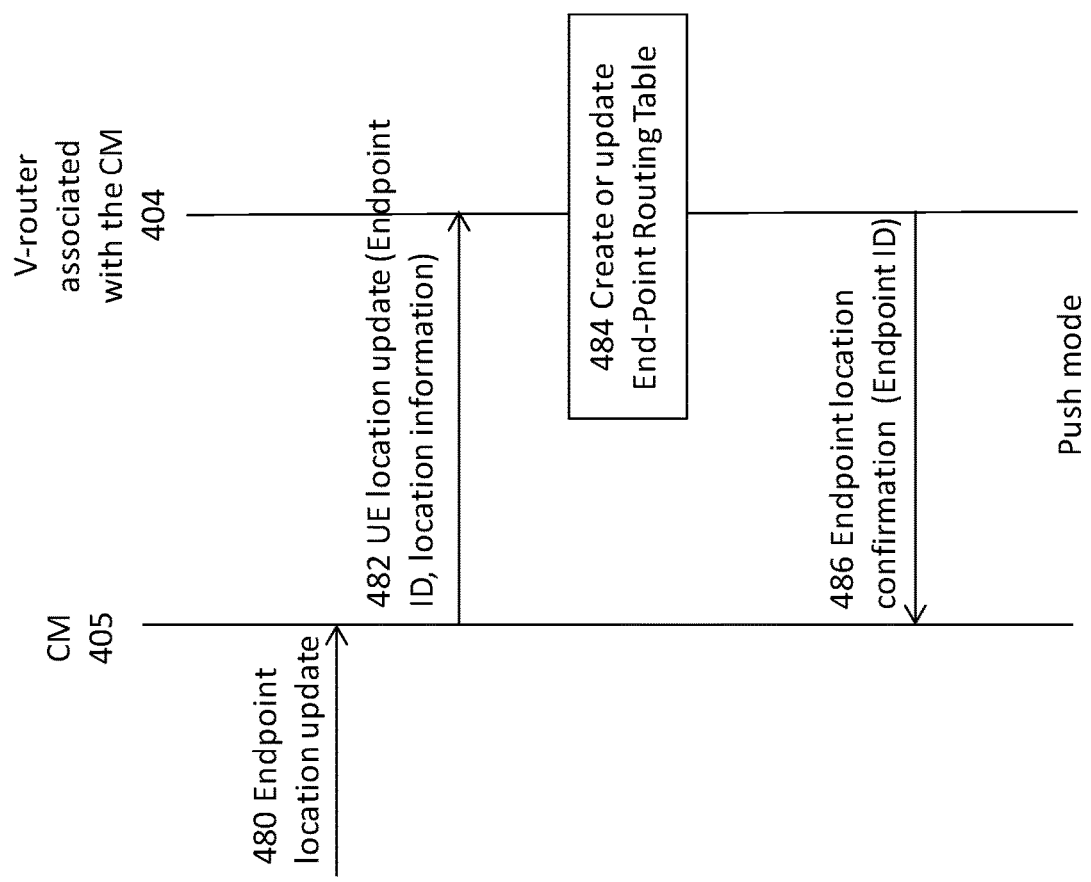
FIG. 4D illustrates interaction between a v-router and a CM, according to embodiments.

FIG. 4D illustrates interaction between a v-router and a CM, including location updating in a push mode (rather than the request mode of FIG. 4C), according to an embodiment. The CM provides the v-router with updated location information without requiring a request from the v-router. The updates can be triggered for example by the end point moving into a new domain. The CM 405, which may for example be a cluster CM, domain CM, or global CM, receives 480 an end point location update, for example from an end point or function monitoring and end point. The CM 405 then transmits 482 an end point location update, including the end point name identifier and location information, to a v-router 404 associated with the CM 405. The v-router 404 creates or updates 484 a corresponding entry in its end-point routing table to record the current location of that end point. The v-router may also transmit 486 a location confirmation to the CM 405, indicating that the location update is successful. In some aspects, the v-router may forward the end point location update to other v-routers, such as v-routers located lower in the network hierarchy.

It is noted that various combinations of push mode and request mode updating may be employed, for example in order to trade-off signaling overhead and location accuracy.

In some embodiments, following location registration, the v-routers of the VN are configured to create an entry (associated with the registered end point) in an end point routing table held thereby. The entry includes current routing information for the end point. Information may include, for example, a VN ID, an end point name identifier, and an identity of a next VN node to use for routing packets toward the end point via the VN. FIG. 5 illustrates example operation of a VN in relation to the VN routing process for a a mobile end point. In this example, v-router 1 is to forward data packet to destination end point device B which is associated with VN Node 2. V-router 1 checks its end point routing table and determines that the next VN node ID=2. The v-router inserts VN ID and VN node ID to the packet and submits the packet to SDRA-Op for handling.

Figure 5A:
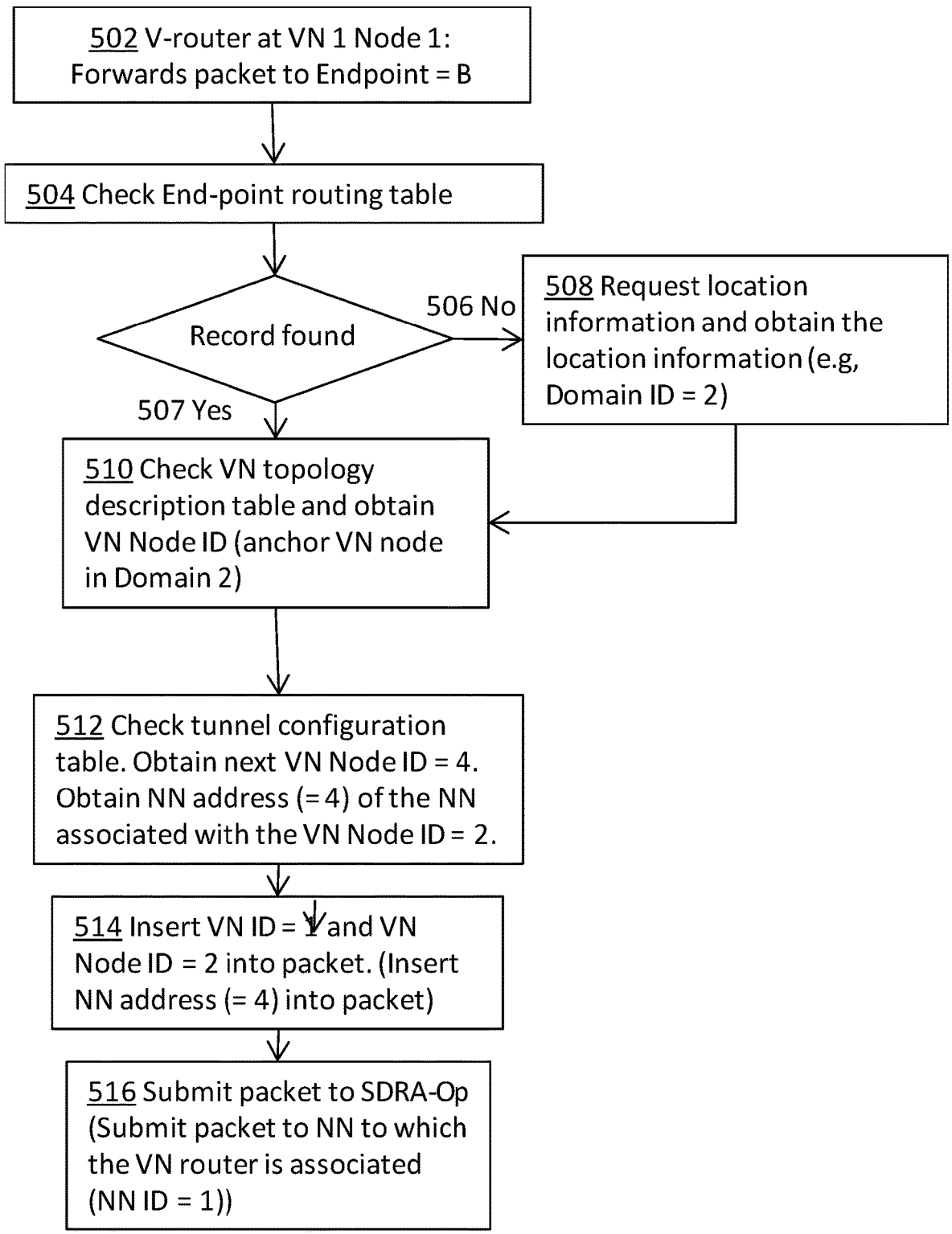
FIG. 5A illustrates operation of a v-router according to an embodiment.

FIG. 5A illustrates operation of a v-router according to an embodiment. The v-router 562 labelled "VN 1 Router 1" and located at VN 1 node 1 552 (see FIG. 5E) is presented with a task 502 to forward a packet to an end point with ID "end point B". To execute this task, the v-router checks 504 an end point routing table accessible thereto, for a record associated with this end point. If a record is not found 506, then the v-router 562 transmits a request 508 for location information to a CM entity 580 (see FIG. 5E), and obtains a response including location information for end point B. Otherwise, if a record for end point B is found 507 in the end point routing table, the location information request 508 can be omitted. The location information may be, for example, an identity of a network domain (e.g. "Domain ID=2" via which end point B is currently accessible.

Figure 5E:
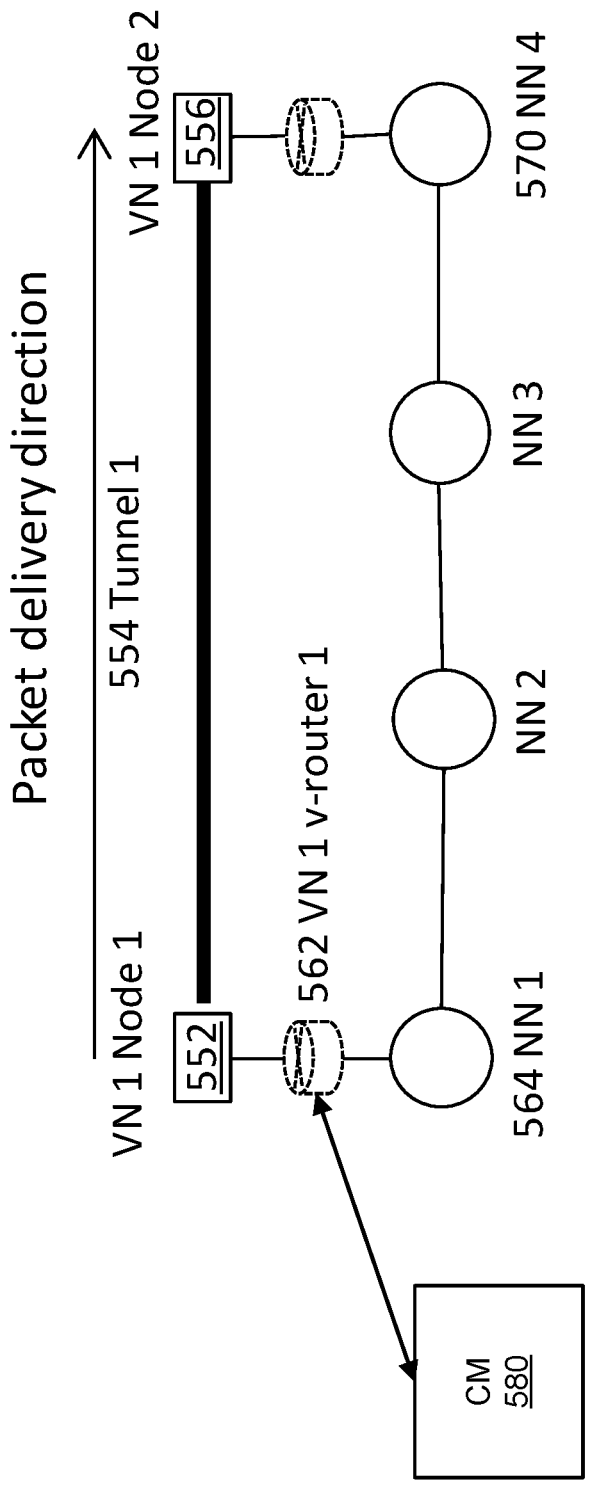
FIG. 5E is a simplified network architecture diagram supporting the embodiments of FIGS. 5A, 5B, 5C, and 5D.

Next, the v-router 562 checks 510 a VN topology description table accessible thereto, and obtains the identity of a VN node, such as an anchor VN node, which is also associated with the obtained location information, and which is therefore usable to route packets toward end point B. In the present example, the anchor VN node is accorded identity "VN Node 2" 556 (see. FIG. 5E). Next, the v-router 562 checks 512 its tunnel configuration table and obtains the identity of the next VN node, the identity of the tunnel to use to forward the packet toward VN Node 2 556, and/or the network-level address of the network node associated with VN Node 2 556 (i.e. NN 4 570). In the present example, because VN 1 Node 1 552 is directly connected to VN 1 Node 2 556 via a single logical tunnel 554 of VN 1, the next VN Node is also equal to the destination VN Node 2 556.

Next, the v-router 562 configures the packet for transmission, for example by inserting 514 the VN ID and next identity of the next VN node (VN Node 2 556) into the packet, and/or by inserting the network-level address of the network associated with VN Node 2 (NN 4 570) into the packet. The v-router then submits 516 the packet for forwarding by the appropriate logical tunnel 554, for example by submitting the configured packet to SDRA-Op, or by submitting the packet to the network node to which the v-router 562 associates (i.e. NN 1 564).

FIG. 5B illustrates an end point routing table 520 held by the v-router 562, according to an example embodiment. The table holds location information for end points as obtained by the v-router, for one or possibly more VNs supported by the v-router.

FIG. 5C illustrates a VN topology description table 530 held by the v-router 562, according to an example embodiment. The table holds, for one or possibly more VNs supported by the v-router, associations between domain identifiers descriptive of potential end point locations and VN node IDs usable to communicate with end points in such locations.

FIG. 5D illustrates a logical tunnel configuration table 540 held by the v-router 562, according to an example embodiment. The table holds, for one or possibly more VNs supported by the v-router, associations between destination VN nodes and next-hop information for routing packets toward such destination VN nodes. The next-hop information may indicate a next VN node along a path to the destination VN node, a next logical tunnel along the path, and/or the network-level address of the network node to which the next VN node along the path associates.

The operations described above with respect to FIGS. 5A to 5E can be varied in several ways. Generally, the v-router, having a packet to forward to an identified destination and via a designated VN, obtains (from the CM or from its internal end point routing table), location information for the destination. The v-router combines the location information with other stored information indicative of the (relatively static) topology and configuration of the VN, and forwards the packet via the VN based on the combined information. This may include determining another node of the VN network which is closer (in the VN topology) to the destination's location, and forwarding the packet toward said other node via logical tunnels of the VN.

In various embodiments, for a VN which provides services to mobile end points, the v-router operates to determine a current anchor VN Node of this mobile end point or a current ID of the domain which the end point is currently in. For data traffic routing to a mobile device, the v-router obtains the current location information (domain ID or cluster ID) from the CM to which the v-router associates. The v-router checks a VN description table and translates the obtained location information to the destination VN Node ID. Using the VN routing table, the v-router determines the next VN Node ID or Tunnel ID to use. Then the v-router submits the data packet with the VN ID and VN Node ID to SDRA-Op for handling.

In some embodiments, in RAN clusters, multiple tunnels or multiple open tunnels may be defined and realized to enable handover-free operation in support of mobile end points, or to support customer services with high reliability requirements.

In some embodiments, at a RAN cluster and to deliver a data packet to a mobile end point, a v-router in the RAN cluster is configured to obtain, from the CM, location information indicative of one or more candidate edge nodes for reaching the mobile end point. The v-router then determines the destination edge nodes (or tunnels connecting thereto) and sends the packet with one or multiple destination node IDs (as well as a VN ID) to SDRA-Op for conveyance to associated destination edge nodes. This operation may facilitate a multipath transmission, in which different data packets are routed to different edge nodes for transmission, or a multicast transmission, in which a single data packet is routed to different edge nodes for concurrent transmission thereby.

Figure 6:
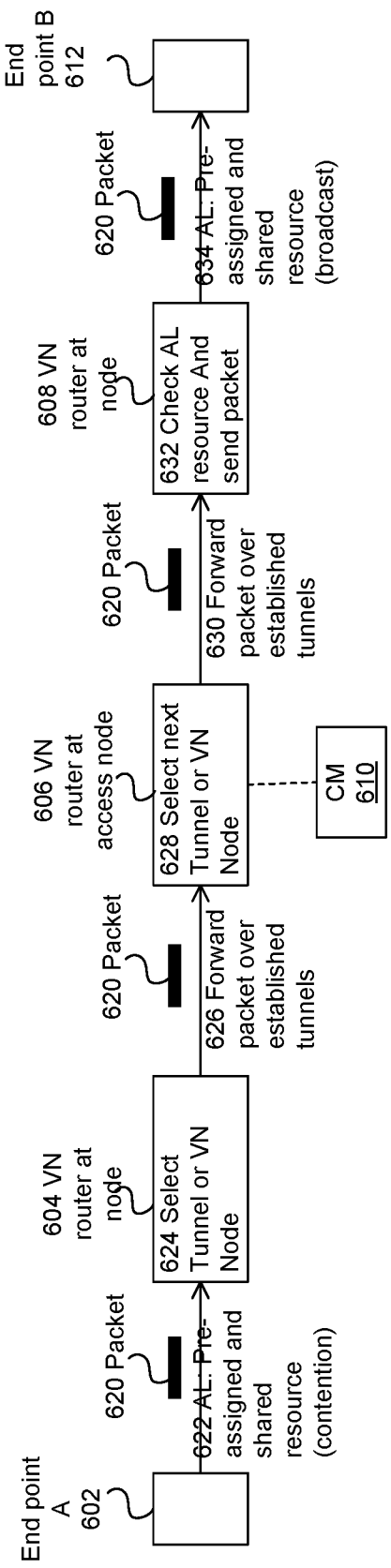
FIG. 6 illustrates an example of end-to-end packet routing for mobile end points, according to an embodiment.

As described above, the location of an end point is tracked by the CM and made accessible to v-routers. As such, end points from which data packets originate need not know the location of the end points for which the data packets are intended. Data packets of end points traverse the VN along a route which is controlled by the v-routers, which may be functionalities of SDT-Op. FIG. 6 illustrates an example of end-to-end packet routing for mobile end points, according to an embodiment.

In more detail, end point A 602 is to transmit a packet to end point B 612. Both end points 602 and 612 are assumed to have registered to an associated service and with the CM 610. The end point transmits a packet 620 using certain access link resources 622, which may in some embodiments be pre-assigned and/or shared resources. Shared resources may be accessed on a contention basis. A v-router 604 associated with the edge node which receives the packet 620 processes the packet and selects 624 a next tunnel or VN node to which to submit the packet. The selection may be made on the basis of the routing tables of the v-router 604. The v-router forwards 626 the packet over established logical tunnels of the VN. A v-router 606 at another VN node receives the packet and operates to select a next tunnel or VN node to which to submit the packet. The selection may be based on end point information supplied by a CM entity 610 in response to a request or in push mode. The v-router 606 selects 628 a next tunnel or VN node to which to submit the packet. The v-router forwards 630 the packet over established logical tunnels of the VN. A v-router 608 at an edge node in communication with end point B 612 receives the packet, checks 632 the access link resource assignment to use for communicating with end point B 612, and transmits the packet toward end point B. The edge node 632 transmits the packet 620 for receipt by end point B 612 using certain access link resources 634, which may in some embodiments be pre-assigned and/or shared resources.

As such, signaling related to session establishment, re-establishment for a device (session) in 4G systems is omitted in embodiments. Data packet transmission from end-points corresponds to sending data to a network using established VN resources. In some embodiments, this procedure can be a signaling-free procedure or a lightweight signaling procedure, for example in which only access link signaling is needed if there is no pre-assigned access link resource to a VN, or if the pre-assigned resource is not shared among end-points of the VN.

Figure 7:
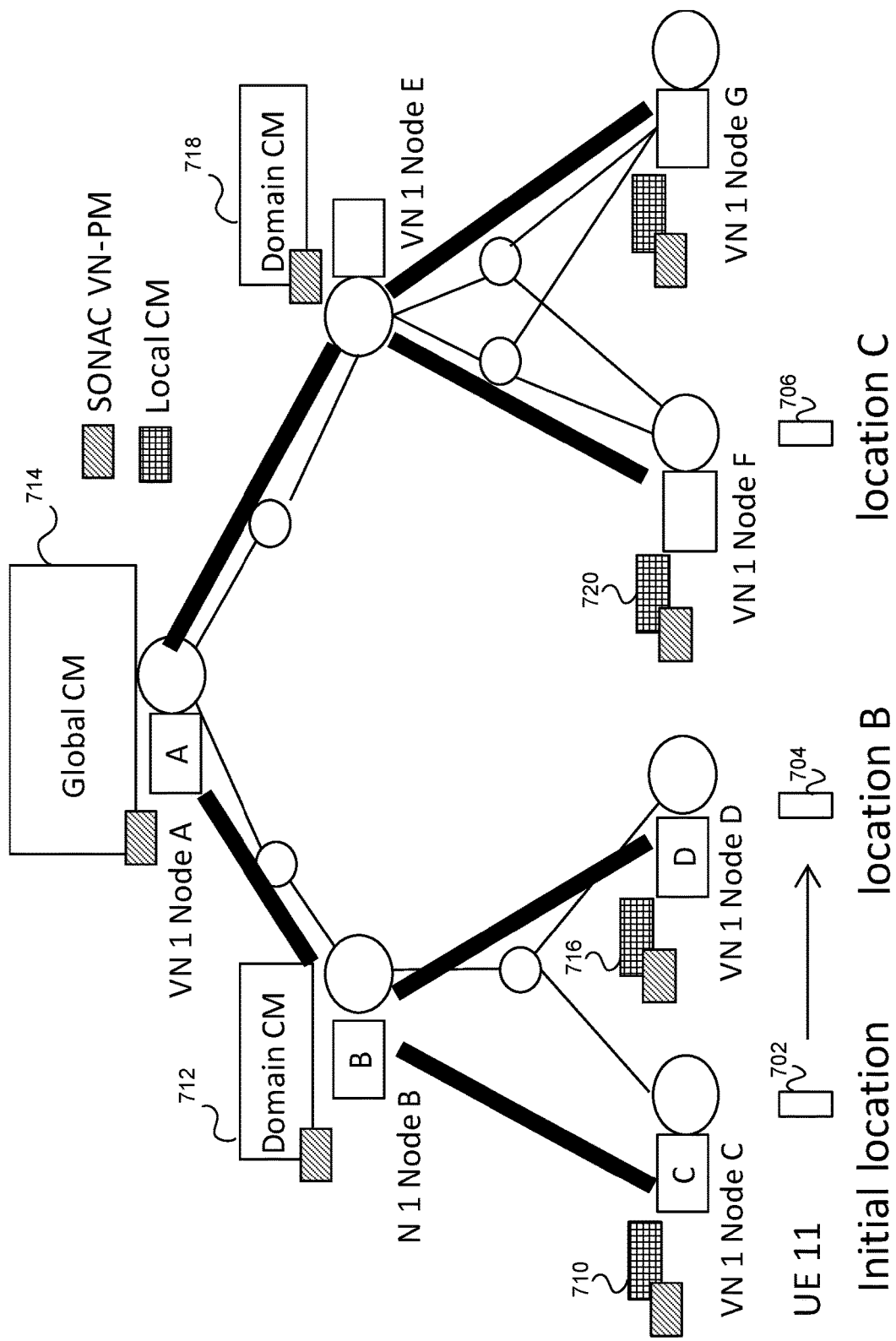
FIG. 7 illustrates tracking of a mobile end point such as a UE moving between multiple locations, according to an example embodiment.

FIG. 7 illustrates tracking of a mobile end point 702 such as a UE moving between multiple locations, according to an example embodiment. The example may be used in association with tunnel-by-tunnel routing.

The end point registers its initial location 702 to CM entities including a local (or cluster) CM 710, domain CM 712 and global CM 714. The global CM 714 creates a new entry in its location table, specifying the end point name identifier and the next VN node to use to route packets to the end point (i.e. VN 1 Node B). The domain CM 712 of VN 1 Node B creates a new entry in its location table specifying the end point name identifier and the next VN node to use to route packets to the end point (i.e. VN 1 Node C). The local CM 710 of VN 1 Node C creates a new entry in its location table specifying the end point name identifier and the access point(s) to use to transmit packets to the end point.

During movement of the end point, the location tracking system continuously updates the device location tables at the CM entities. When the end point reaches location B 704, the domain CM 712 of VN 1 Node B updates its location table to specify the end point name identifier and a new next VN node to use to route packets to the end point (i.e. VN 1 Node D). The local CM 716 of VN 1 Node D creates a new entry in its location table specifying the end point name identifier and the access point(s) to use to transmit packets to the end point. The global CM 714 may remain unaffected.

When the end point reaches location C 706, the global CM 714 updates its location table to specify the end point name identifier and a new next VN node to use to route packets to the end point (i.e. VN 1 Node E). The domain CM 718 of VN 1 Node E creates a new entry in its location table specifying the end point name identifier and the next VN node to use to route packets to the end point (i.e. VN 1 Node F). The local CM 720 of VN 1 Node F creates a new entry in its location table specifying the end point name identifier and the access point(s) to use to transmit packets to the end point.

Figure 8:
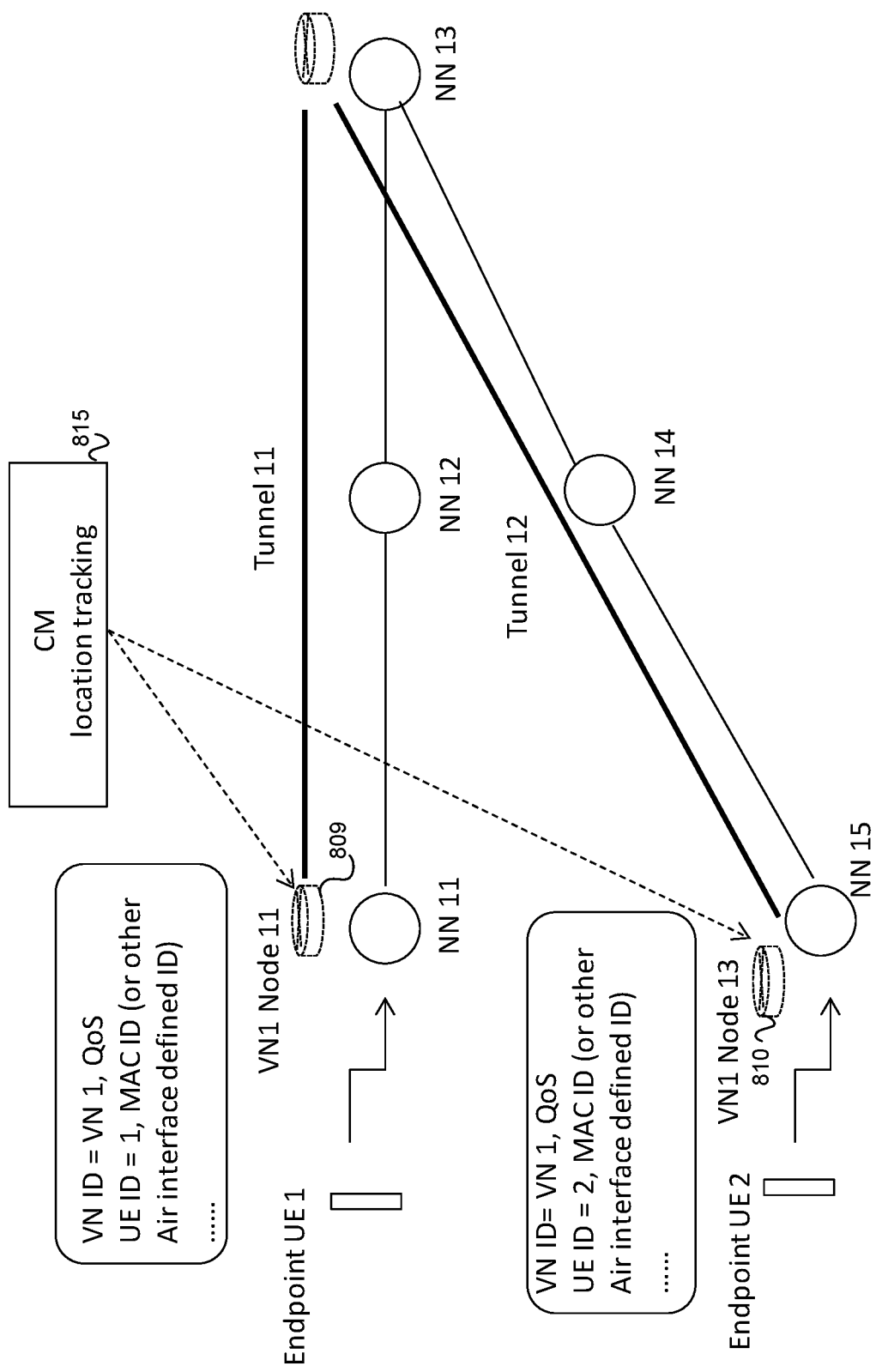
FIG. 8 illustrates routing table operation at VN nodes associated with wireless edge nodes of the communication network.

FIG. 8 illustrates routing table operation at VN nodes associated with wireless edge nodes of the communication network. V-routers 809, 810 are located at edge nodes NN 11 and NN 15 of the communication network. The v-routers maintain routing tables informed by CM location tracking functions 815. The routing tables at the wireless edge node v-routers may specify end points in terms of their identifier and/or air interface-defined identifier, such as a MAC ID.

Figure 9:
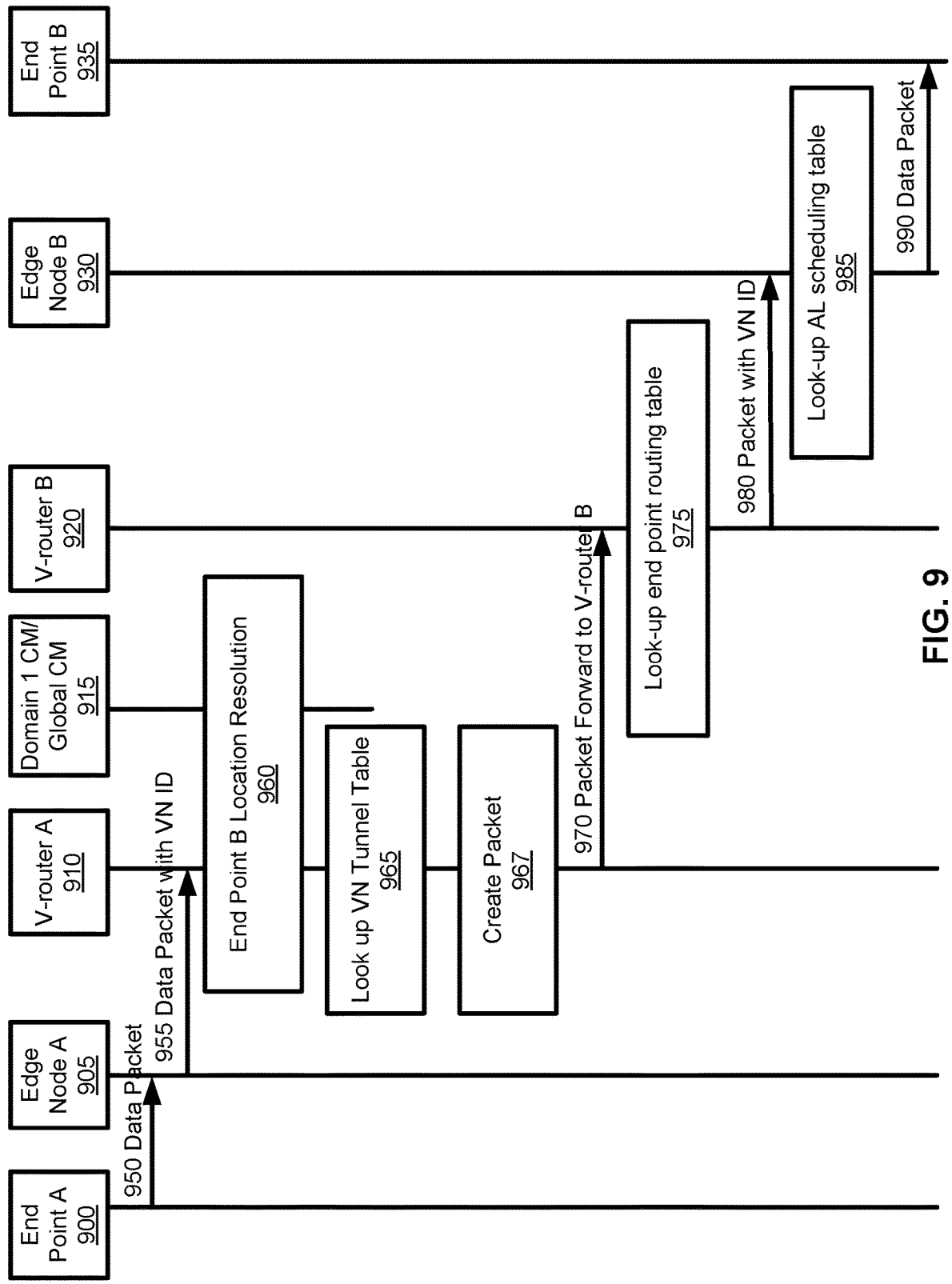
FIG. 9 is a signaling diagram illustrating an example of a hop-on procedure for a first end point A transmitting a packet to another end point B.

FIG. 9 is a signaling diagram illustrating an example of a hop-on procedure for a first end point A 900 transmitting a packet to another end point B 935. A service-based resource allocation is also assumed, in which dedicated VN and access link resources are allocated to this VN. In this assumption, dedicated access link resources are assigned to the VN for both transmission to and from the end points 900, 935 and all end points 900, 935 using the service share the same resources, so that there is no need to differentiate between end points 900, 935. By using dedicated access links, there is no signaling incurred for access link allocation or session establishment. On the network side, location resolution signaling is performed. End point A 900 is associated with an edge node A 905 and has a data packet to transmit to end point B 935 currently associated with edge node B 930. The VN ends at the access link and admission control is not used. It is assumed that the access links in both edge nodes 905, 930 correspond to dedicated resources for the virtual network being used.

In more detail, end point A 900 transmits 950 a data packet designating the VN is to be used and also designating the data packet is destined for end point B 935. The edge node A 905 detects that the packet is to be associated with the VN (or a service thereof) and forwards 955 the packet to the pre-configured next virtual node which hosts v-router A 910. In some embodiments, the edge node A 905 may encapsulate the packet prior to forwarding. The VN node 910 interacts with a CM 915 to perform a location resolution operation 960 for determining the current location of end point B 935. The CM 915 may for example be a domain-level CM or a global CM of a hierarchical CM entity. The VN node 910 then looks up 965 a VN tunnel table in order to determine which VN tunnel is to be used to forward the packet toward end point B 935 via edge node B 930 which is as indicated by the CM 915. The VN node 910 then creates and addresses 967 the tunnel packet. The VN node 910 then prepares and forwards 970 the packet to v-router B which is part of routing the packet toward edge node B 930 via an appropriate set of VN tunnels. The first tunnel is determined by the v-router at the VN node 910, with subsequent tunnels being determined by subsequent v-routers in a hop-by-hop manner. In the forwarding process, another VN node, holding v-router B 920 and serving as an anchor node for end point B 935, receives the packet and performs a lookup operation 975 in an end point routing table to determine that the packet is to be forwarded to edge node 930 which is operating as an edge node for end point B 935. The device routing table holds the association between end point B 935 and edge node 930. The v-router 920 then forwards 980 the packet to edge node 930. Edge node 930 looks up 985 scheduling information associated with the VN in an access link scheduling table. In the present example, edge node 930 determines that dedicated access link resources are to be used for transmitting the packet to end point B 935 according to the service, and that service based scheduling should be used. The edge node 930 then transmits 990 the packet to end point B 935 using these dedicated access link resources and service-based scheduling. If the location of end point B 935 is fixed, location resolution may be omitted. It is also noted that one or both of end point A 900 and end point B 935 may be replaced with other types of end points, such as servers.

Figure 10:
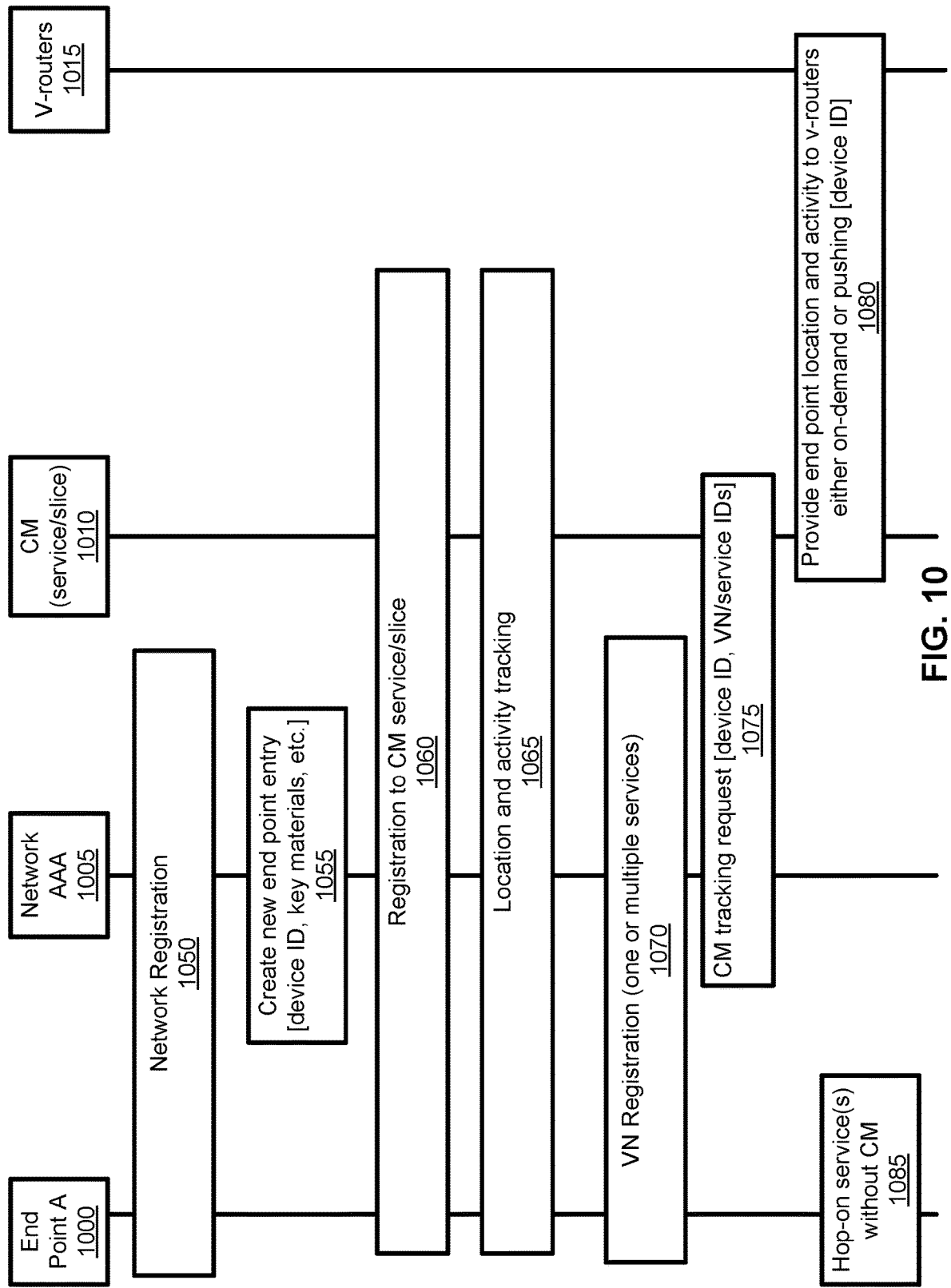
FIG. 10 is a signaling diagram illustrating an example of operations required before hop-on, from the network perspective, according to an embodiment.

FIG. 10 is a signaling diagram illustrating an example of operations required before hop-on, from the network perspective, according to an embodiment. The illustrated process assumes that the logical connection between CMs and VN v-routers has been established (e.g. by SONAC-Com) during VN composition. In this process, no admission control is required.

In more detail, end point A 1000 performs a network registration operation 1050 in association with a network registration entity 1005. The network registration entity 1005 may be an authentication, authorization and accounting (AAA) server, for example. Network registration 1050 is separate from registration to a service or VN. The network registration entity 1005 creates 1055 a new database entry indicating the identity of end point A 1000, and encryption key materials. Following registration with the network, end point A 1000 registers 1060 to a CM 1010, which may reside in a network slice. The CM slice holds CM entities which begin tracking end point A 1000 upon registration. End point location tracking and end point activity tracking are subsequently performed 1065 by the CM entities following the registration. End point A 1000 subsequently registers 1070 with a VN, for example by interaction with the network registration entity 1005, to access one or more services. The network registration entity 1005 responds by submitting a tracking request 1075 to the CM slice 1010. The tracking request includes an identity of end point A 1000 and an indication of the VN (and service(s)) to which end point A 1000 has registered. Where a VN supports only a single service, then the VN ID may be used to identify that service. Where the VN supports multiple services, then the VN ID in combination with a service ID may be used to identify and distinguish between the services.

In response to the tracking request 1075, the CM entities begin providing 1080 location and activity status information for end point A 1000 to the v-routers 1015 of the VN. The information may be provided in a variety of ways, for example by providing information updates as changes to the status information are received, providing updates on a predetermined schedule, and/or providing updates upon request by the v-routers. Subsequently, end point A 1000 may "hop on" 1085 the VN by transmitting and/or receiving data packets.

Figure 11:
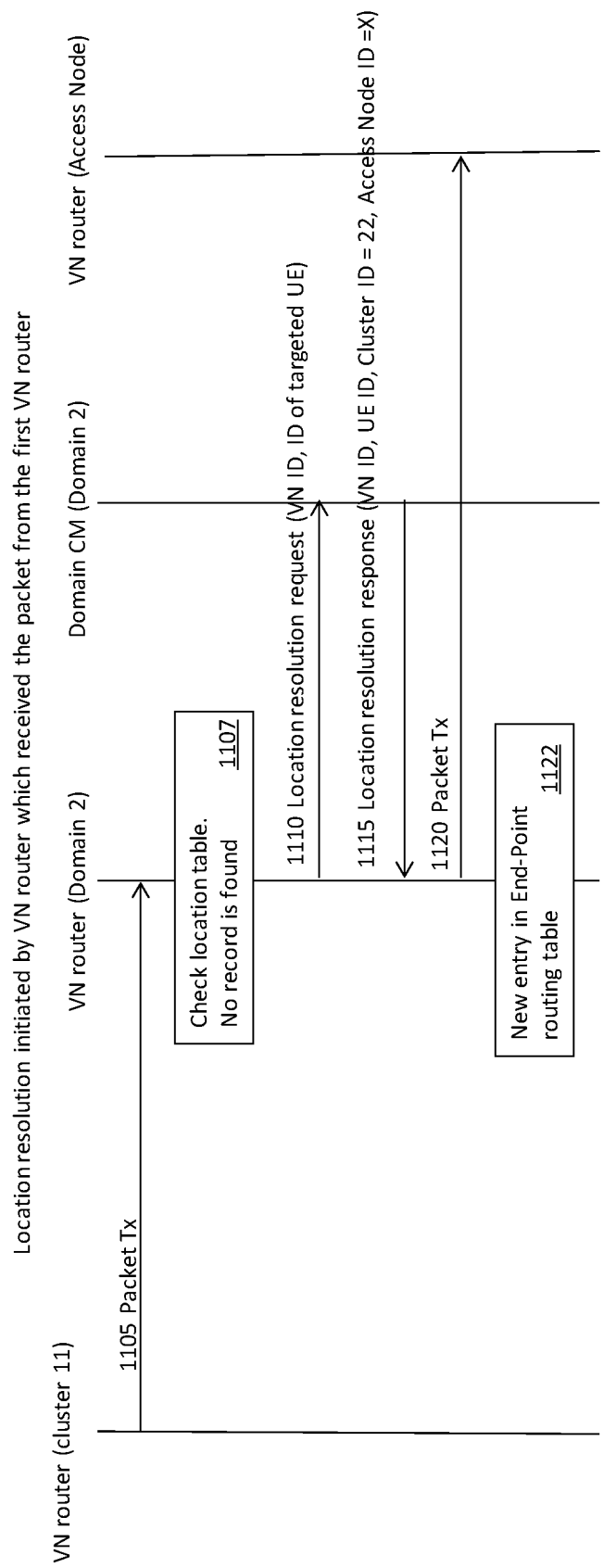
FIG. 11 is a signalling diagram illustrating location resolution initiated by a destination router that received the packet from a first transmitting v-router, according to an embodiment.

Referring to FIG. 11, a signalling diagram illustrating location resolution initiated by a destination router that received the packet from the first transmitting VN router.

In step 1105 the transmitting VN router transmits a packet to the VN router in domain 2. In step 1107 the VN router in domain 2 checks its location table and determines that no corresponding record is in the location table. In step 1110, the VN router in domain 2 transmits a location resolution request to the domain CM for domain 2. The domain CM obtains the location information to satisfy the location resolution request, similar to the procedure outlined in FIG. 1. In step 1115 the domain CM for domain 2 returns the location resolution response. In step 1120 the VN router for domain 2 then forwards the received packet to the location identified in the location resolution response. In optional step 1122, the VN router in domain 2 updates, or creates, an entry in its end-point routing table using the received location information in the location resolution response.

In an aspect, only specified VN routers within a domain will initiate location resolution. This mode may be useful, for instance, in network domains that have a tree topology. Typically, the specified VN routers will be higher in the network hierarchy. For example, a packet intended for an unknown destination is forwarded by lower level VN routers to the specified VN router of the slice in the domain. The specified VN router then performs the location resolution to direct the packet to its intended destination.

Figure 12:
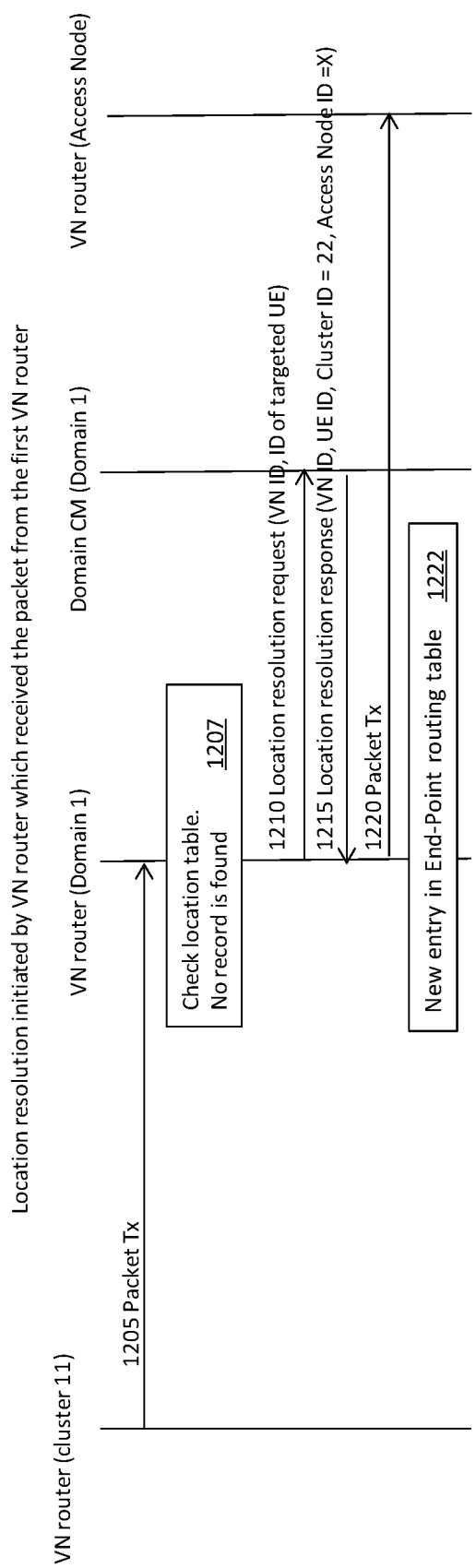
FIG. 12 is a signalling diagram illustrating location resolution by a specified v-router, according to an embodiment.

Referring to FIG. 12, in step 1205 a transmitting VN router, such as a VN cluster router, transmits or forwards to the specified VN router a packet addressed to a destination UE. In this example, the specified VN router is the domain router. In step 1207, the specified VN router checks its location table and determines that no corresponding record is in the location table. In step 1210, the specified VN router transmits a location resolution request to the domain CM. The domain CM obtains the location information to satisfy the location resolution request, similar to the procedure outlined in FIG. 1. In step 1215 the domain CM returns the location resolution response including the location information for the destination UE. In step 1220 the specified VN router forwards the packet transmission to a destination VN router, i.e. the AN serving the destination UE, using the received location information. In optional step 1222 the specified VN router updates, or creates, an entry in the end-point routing table corresponding to the destination UE. Optional step 1222 occurs after the location resolution response has been received by the VN router, but may occur either before or after the step 1220 packet transmission.

In the pushing mode, the location tracking information for a destination UE is pushed to a VN router which requested the location of the destination UE. The requesting VN router maintains the received location information for the destination UE in its end-point routing table. Subsequent packets addressed to that destination UE may be directed using the received location information. The requesting VN router may maintain this entry in its end-point routing table until: i) there are no received packets addressed to that destination UE within a predetermined period of time (i.e. an idle period which implicitly indicates that the session is over); or, ii) the UE generating the packets to that destination UE leaves the requesting VN router's coverage area.

Figure 13:
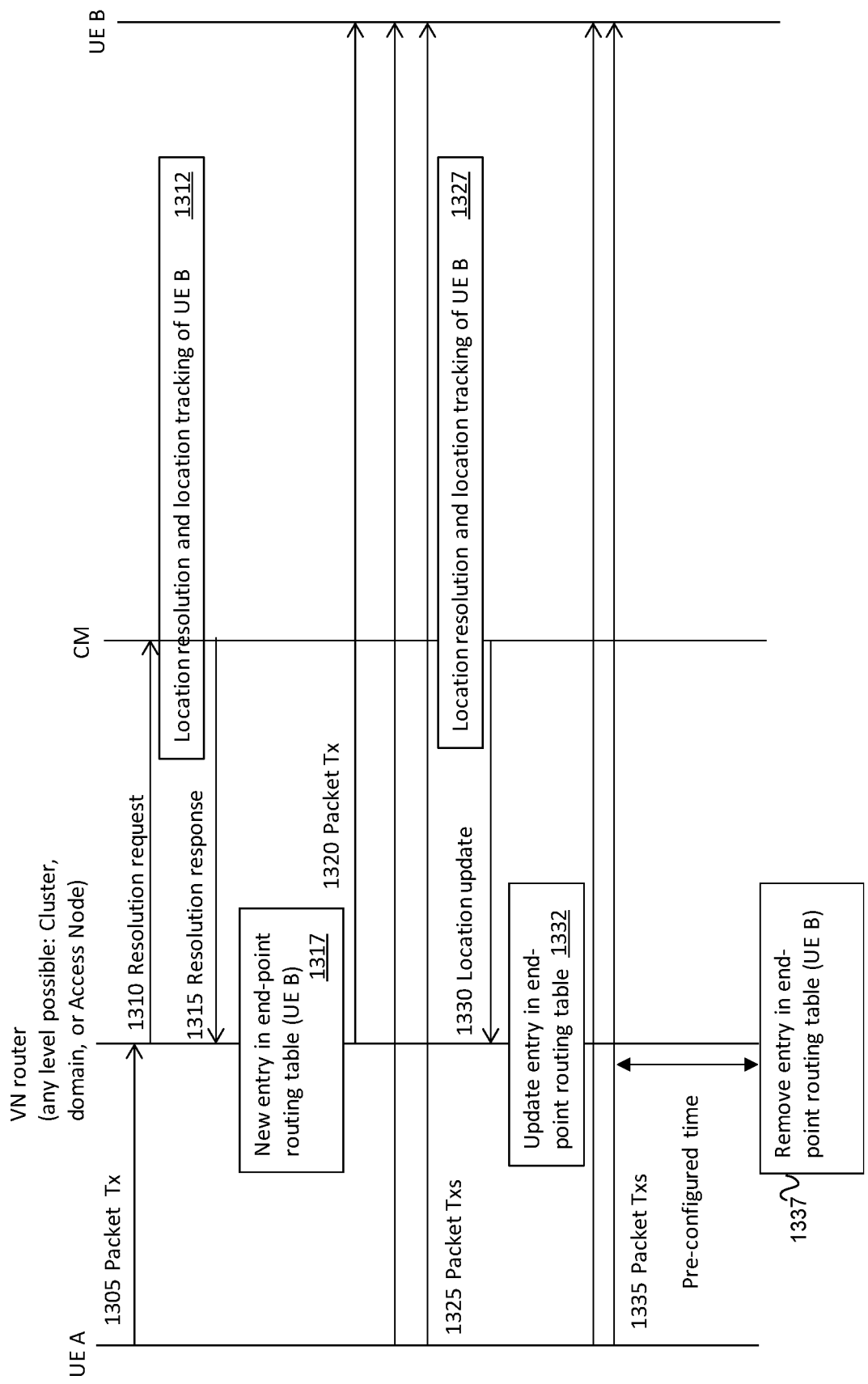
FIG. 13 is a signaling diagram illustrating a location resolution pushing mode where the destination end point moves, according to an embodiment.

Referring to FIG. 13, in example 1 the destination UE B moves over the course of a session. For simplicity of illustration, the signalling diagram assumes that UE A is fixed but in practice it may also move out of the coverage of the VN router). In step 1305 a transmitting UE A transmits a packet intended for UE B to a VN router. The VN router in this case may be any level within the hierarchy (i.e. the VN router is a specified VN router as discussed above). The VN router determines that it does not know the location of the intended destination of the received packet. In step 1310, the VN router transmits a resolution request to a CM. The CM resolves the location of UE B in step 1312. In step 1315 the CM transmits a location resolution response to the requesting VN router including location information corresponding to the intended destination, UE B. In optional step 1317 the VN router may update, or create a new entry in, its end-point routing table for the location corresponding to UE B. In step 1320 the VN router forwards the packet to the UE B using the received location information. Optional step 1317 occurs after the location resolution response has been received by the VN router, but may occur either before or after the step 1320 packet transmission.

In steps 1325, the UE A, via the VN router, may transmit further packets in the session to the destination UE B. In step 1327 the CM determines that the UE B has changed location. In step 1330 the CM transmits a location update to the VN router. In step 1332 the VN router updates the corresponding entry it its end-point routing table. In step 1335 future packets are similarly forwarded to the UE B by the VN router using the location update. After a pre-configured period of time with no packets transmitted by UE A. In step 1337 the VN router may remove the corresponding entry from its end-point routing table.

In another example of the pushing mode, the transmitting UE A may move over the course of the session. In this example, the destination UE B is fixed for simplicity of illustration, but in practice the destination UE B may also move during the session as illustrated above with reference to FIG. 13.

Figure 14:
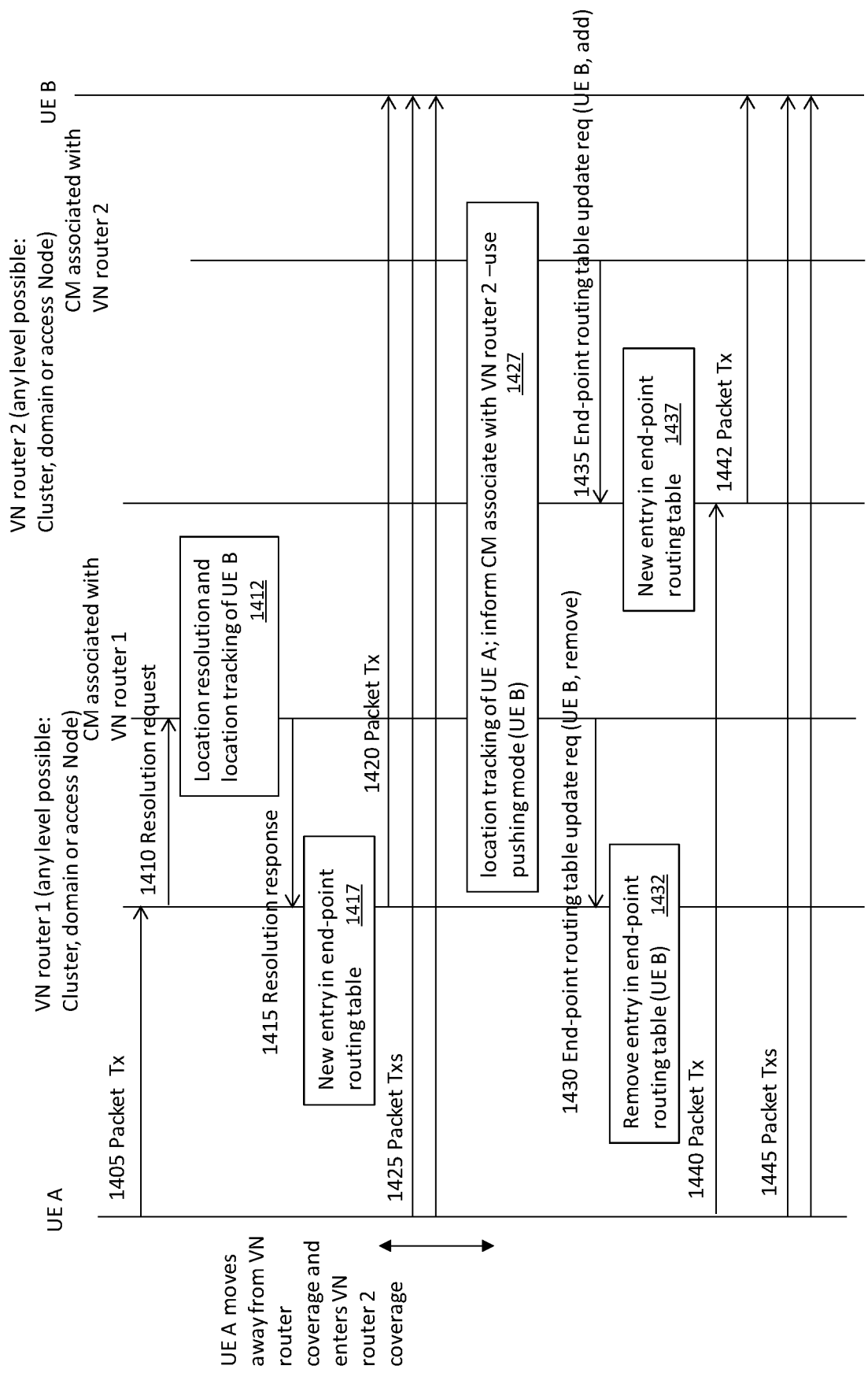
FIG. 14 is a signaling diagram illustrating a location resolution pushing mode where the transmitting end point moves, according to an embodiment.

Referring to FIG. 14, in step 1405 the UE A may transmit a packet intended to the intended destination, UE B. At step 1405, the UE A is within a first coverage area corresponding to a first VN router. The first VN router evaluates the received packet and determines that it is not able to resolve the location. In step 1410 the first VN router forwards a location resolution request to a CM associated with that first VN router.

In step 1412 the CM associated with the first VN router resolves the location of destination UE B, as described above. In step 1415, the CM returns to the first VN router a location resolution response including the location information corresponding to the destination UE B. The first VN router may update, or create, a corresponding entry in its end-point routing table in step 1417. In step 1420 the packet is forwarded to the destination UE B using the received location information. In step 1425, the UE A and the first VN router continue to transmit packets to the destination UE B using the received location information. In step 1427 the CM determines that the UE A has moved from the first coverage area of the first VN router to a second coverage area of a second VN router. If necessary, the CM informs a second CM associated with the second VN router. In step 1430 the CM sends an end-point routing table update the first VN router to remove the destination UE B location information. In step 1435 the second CM sends an end-point routing table update to the second VN router to add the destination UE B location information. In step 1432, the first VN router may remove the corresponding end-point routing table entry, and in step 1437 the second VN router may add its corresponding end-point routing table entry.

In step 1440 the UE A transmits a packet intended for destination UE B to the second VN router. In step 1442 the second VN router forwards the packet to the destination UE B based on the updated location information. In step 1445 the UE A continues to forward packets intended for the destination UE B to complete the session to the second VN router.

In an implementation, the VN router may be customized for a content caching and forwarding (CF) slice. In an aspect, the SONAC-Com for a CF slice may determine the cache locations, capacity, and topology. The VN nodes (stop and temporary cache) are caches associate with physical NNs within the topology. The SONAC-COM determines the VN level routing table.

Figure 15:
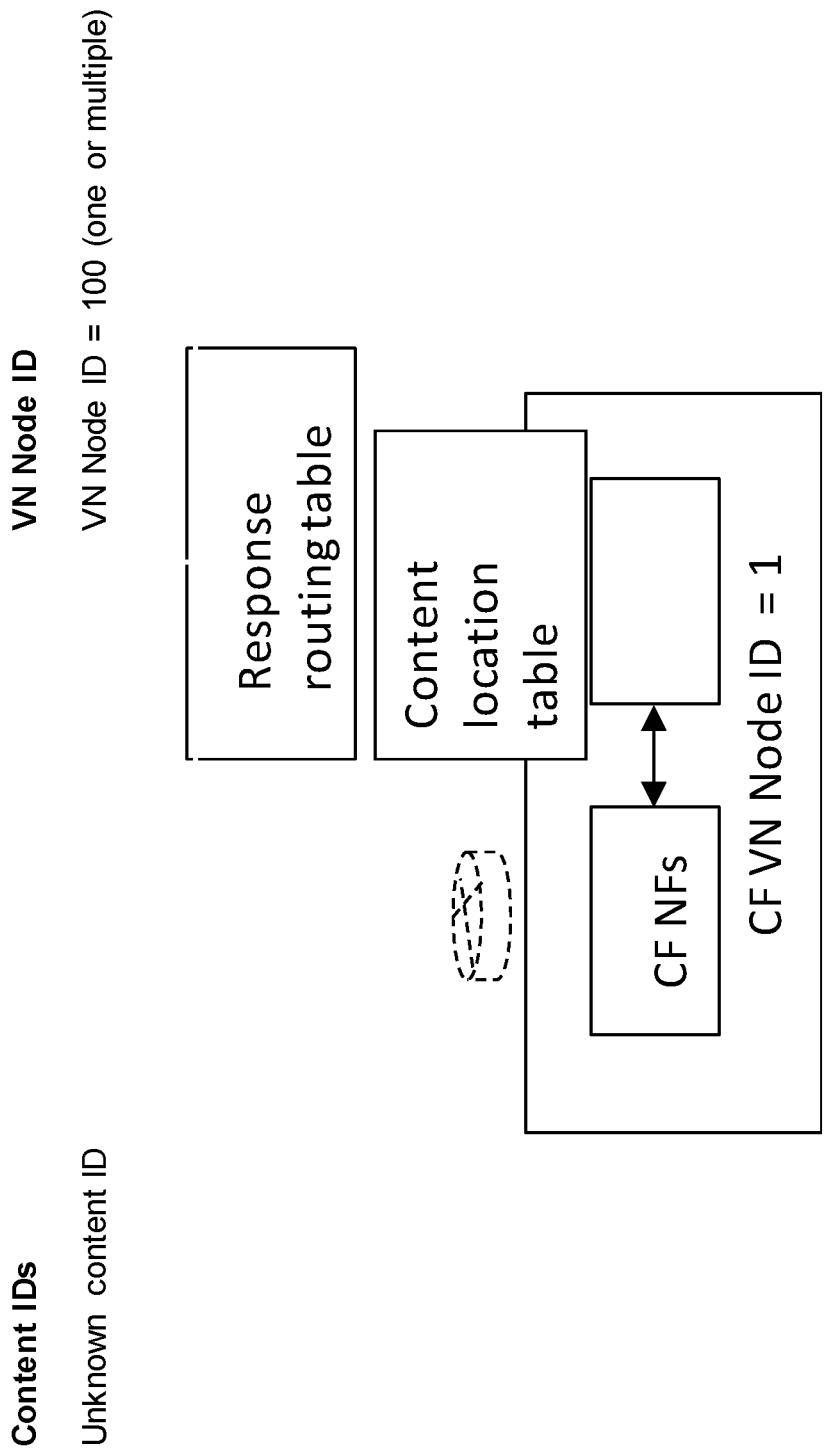
FIG. 15 is a block diagram illustrating an embodiment of an interaction between a v-router and caching and forwarding network functions, according to an embodiment.

The SONAC-Op for a CF slice includes a specific SDT-Op that determines the request routing and response routing. The request routing includes the following steps:
  Receive a request packet, check certain field of packet, determines the content ID
  Check the content cache table
  Determine the destination VN node ID if available otherwise to upper layer VN Node of CF slice
  Update response routing table [content, requesting VN node ID from there the request was received]
  Send the request packet to the SDRA-Op
The response routing includes the following steps:
  Check response routing table [content ID, requesting VN Node ID]
  Send the response and the VN node ID to SDRA-Op
A CFM slice dedicated to managing CF slices may included specific CF functions including:
  Monitor the content request frequency by DAM
  Determine and manage the local cache->interfacing with NF-caches
  Register to upper layer CFM function and neighbor CFM functions when any new content is cached
  Indicate to CF VN router (content cache table content ID, VN Node IDs) whenever content registration is received from other CFMs
  Similar to the CM, the CFM may provide location responses locating a destination UE to a requesting VN router Referring to FIG. 15, an example of a CF slice CDT-OP configuration of a VN router is illustrated. The SDT-Op may establish both a VN level routing table, as described above, and a content routing table. The content routing table providing instructions for handling unknown content received at a VN router. For example, all content with an unknown content ID may directed to one or more specified VN nodes (identified by corresponding Node IDs) to handle. In this example the VN Node ID=100.

Figure 16:
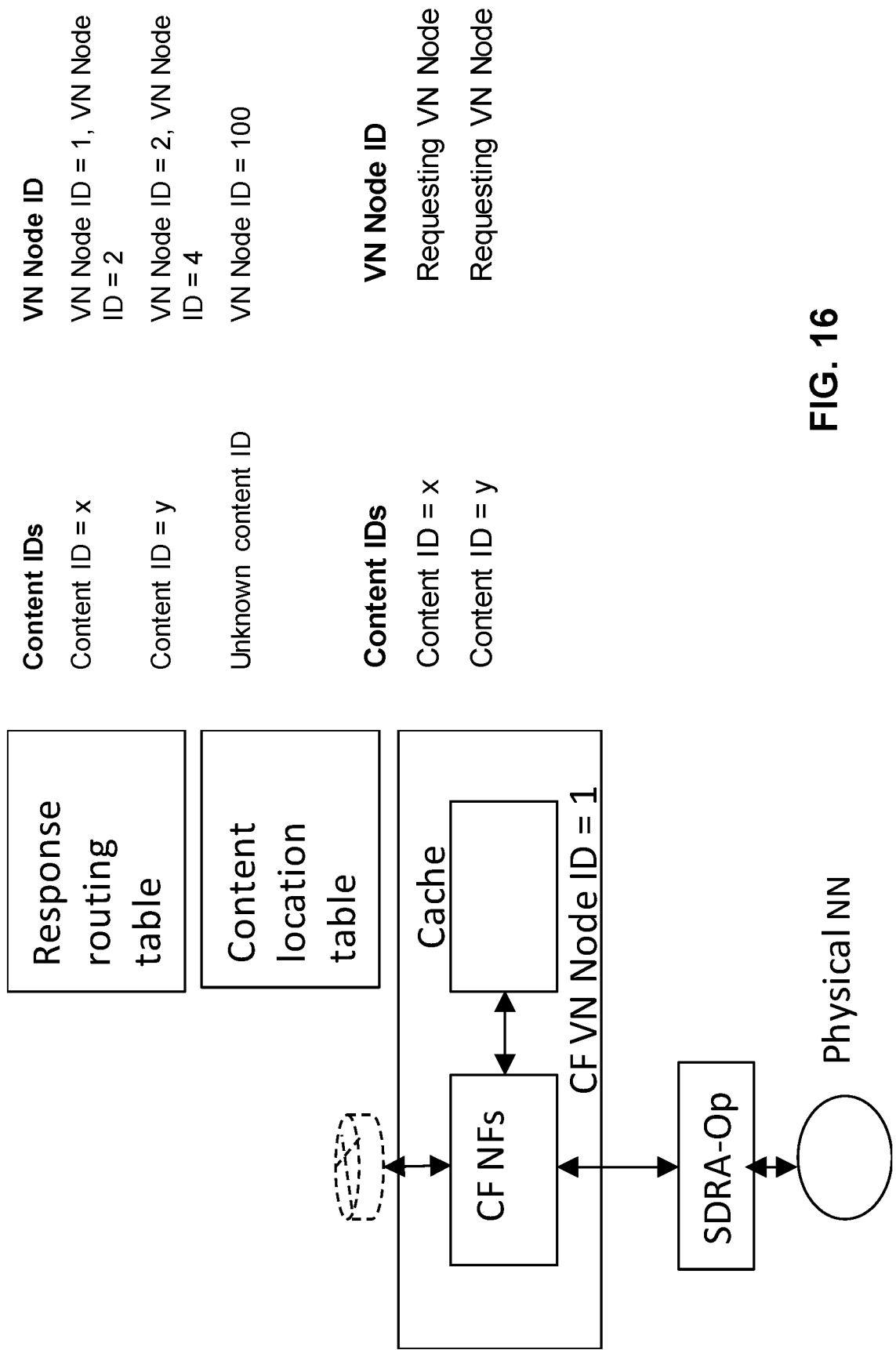
FIG. 16 is a block diagram illustrating an embodiment of an interaction between a v-router, caching and forwarding network functions, a SDRA-OP, and a physical NN, according to an embodiment.

The interface between a VN router, SDRA-OP, the lookup tables, and the physical NN is illustrated in FIG. 16. In operation, a CF VN router:
1. receives a content request [content ID or other equivalent] sent by a cache and forwarding (CF) network function (NF)
2. the request is analyzed to obtain the requested content ID
3. the content ID is sent to the CF VN router
4. the CF VN router checks the content location table
  If the content ID is found and locally available
    a. CF VN router then indicates CF NF (content ID and VN Node ID for response packet routing) to obtain the content, create response packets, and insert the VN Node ID into the response packets
    b. The packet(s) is sent to SDRA-Op
    c. Subsequent operations are the same as for other slices
  If the content ID is found but not locally available, the CF VN router checks the corresponding VN Node ID (if multiple VN nodes cache the content, CF VN router needs to determine which VN Node(s) should provide the content.)
    a. CF VN router inserts the corresponding VN Node ID into the requesting packet and sends the amended packet to SDRA-Op
    b. CF VN router creates a new entry (or in some embodiments updates an existing entry) [content ID, requesting VN Node ID, (may time stamp)]

c. Subsequent operations are the same as for other slices.

If the content ID is not found the CF VN router needs to check the request forwarding table (for unknown content):
  a. CF VN router inserts the VN Node ID and send to SDRA-Op
  b. SDRA-Op sends the packet to NN.

Figure 17:
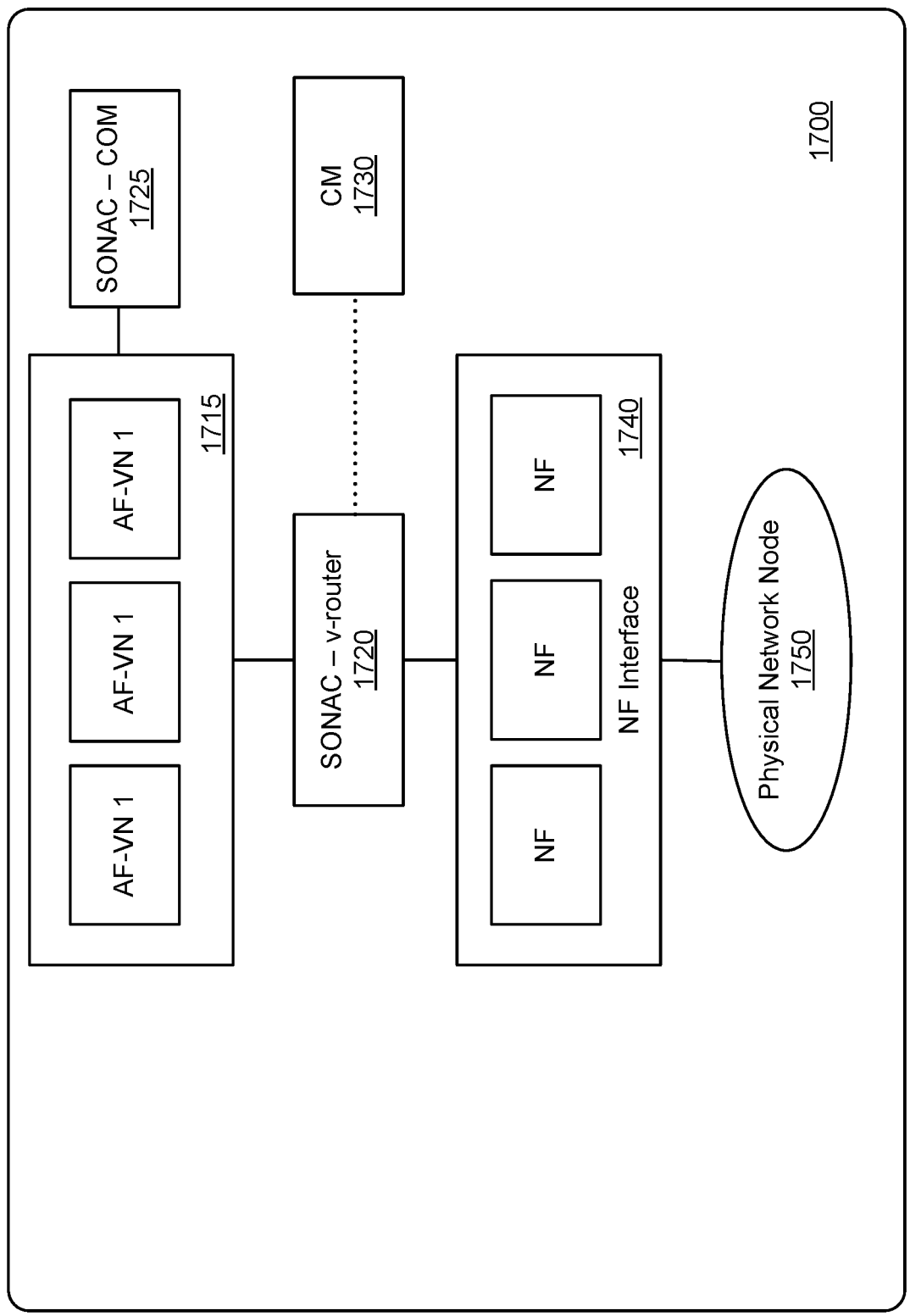
FIG. 17 illustrates an apparatus associated with a VN node, according to an embodiment.

In operation, the following steps occur:
1. The CF VN Node receives a response packet
2. The response packet is sent to the VN router
3. The VN router determines the content ID and the response routing table and obtains the requesting VN Node ID
4. The VN router inserts the VN Node ID into the packet and sends the packet to SDRA-Op (or via VN NF)
5. The subsequent operations are the same as for other slices FIG. 17 illustrates an apparatus 1700 associated with a VN node, according to an embodiment, which may also be regarded as a functionality of SONAC, along with interfaces thereof. The apparatus includes a v-router 1720, which may be regarded as or managed by a SONAC-Op component. The v-router 1720 may be configured by SONAC-Com 1725, which is illustrated as a separate component for clarity. The v-router 1720 may also communicate with a connection management (CM) entity 1730, in order to receive obtain current location information of end points for use in updating routing tables of the v-router. The v-router and/or SONAC-Op may also interface with one or more application functions (AF) 1715 which may be used to facilitate service delivery, for example by performing in-network processing. The v-router 1720 is also associated with a physical network node 1750, such as a router or switch.

The v-router 1720 can be VN specific. Alternatively, the v-router can be shared by multiple VNs and/or services, in which case network function interfaces 1740 with multiple VNs may be provided.

Figure 18:
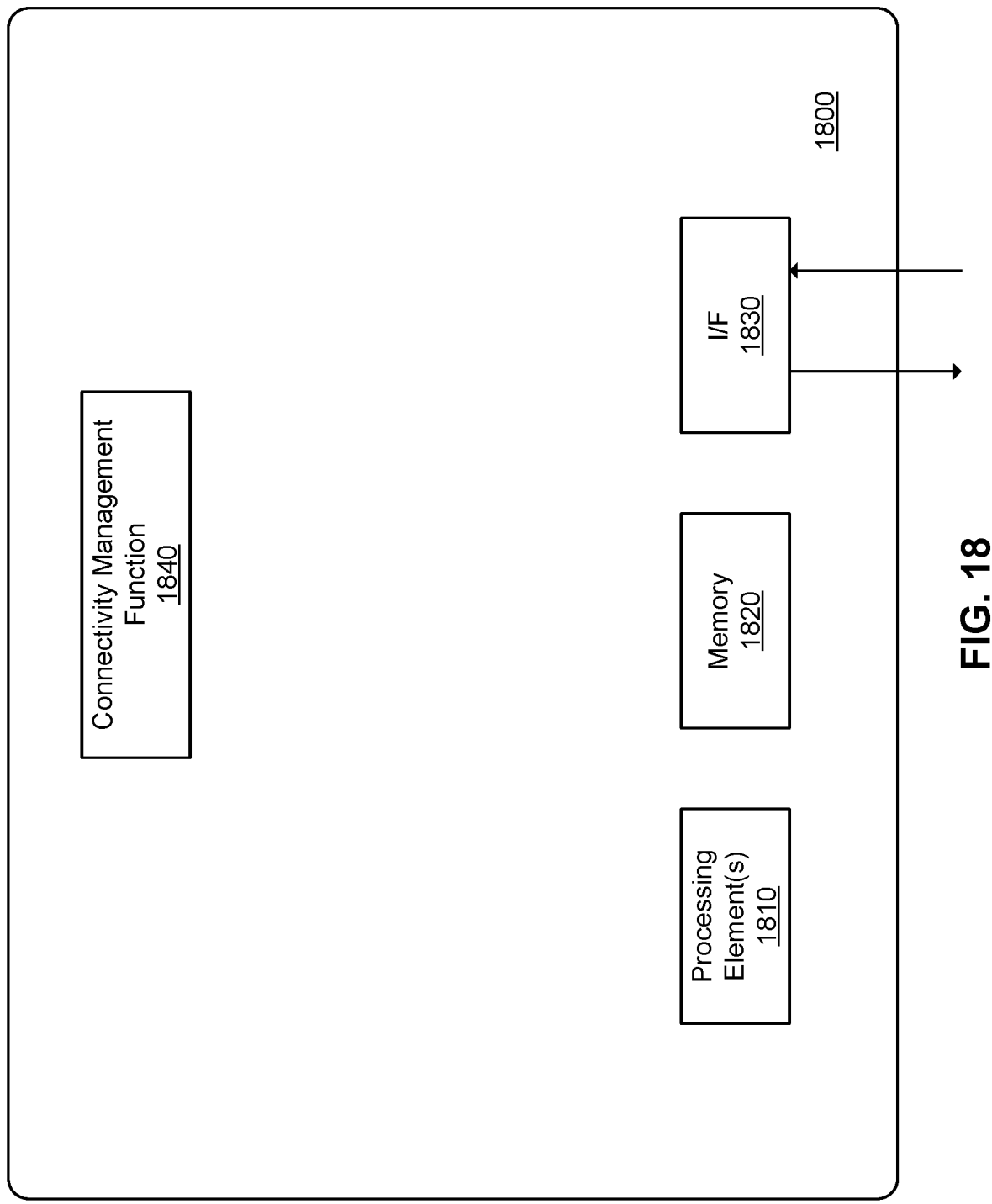
FIG. 18 illustrates a connectivity manager apparatus, according to an embodiment.

FIG. 18 illustrates a connectivity manager apparatus 1800, according to an embodiment. The apparatus includes one or more processing elements such as a computer processor 1810, a memory 1820 such as an electronic computer memory, and a network interface 1830 configured to bi-directionally communicate with other network nodes in the communication network. In this and other apparatuses, the processor and memory configuration may be supplemented or replaced with other electronic hardware, such as integrated circuits or logic gate systems. The processor and memory (or other hardware components) are configured to perform a connectivity management function 1840 which registers and tracks end point locations and provides location updates to v-routers. The connectivity management function 1840 communicates with v-routers to provide the location updates thereto, and may receive location resolution requests from the v-routers and/or other connectivity managers. The connectivity manager apparatus 1800 interacts directly or indirectly, via the network interface 1830, with end points, in order to perform the end point registration and perform location tracking of the end points, for example by obtaining location reports from edge nodes communicating with the tracked and registered end points. In some embodiments, the connectivity manager apparatus 1800 may further include a registration function to facilitate connection registrations and an admission control function to manage authentication and admission of requesting devices.

FIG. 19 illustrates an apparatus 1900 in the network which is provided using a virtualization approach. The apparatus illustrated in FIGS. 17 and 18 may be virtualized, for example. In particular, the apparatus 1900 may be configured as a v-router. The apparatus includes a physical node 1910, which may be a core network node or an edge node of the communication network. The physical node includes at least a communication interface 1915. The apparatus further includes cloud or data centre computing resources 1920 including one or more processing elements, such as computer processor(s) 1930 and memory resources 1935 that are allocated for use to the physical node 1910. The cloud/data centre resources 1920 are typically located at least partially remotely from the physical node 1910 and linked to the physical node 1910 via communication between the communication interface 1915 and a communication interface 1925 located in the cloud or data center. In other aspects, the cloud/data centre resources 1920 may be supported by one or more servers either co-located with the physical node 1910, or communicatively linked to the physical node 1910. The cloud/data centre resources 1920 may be used to implement one or more functions 1940 of the apparatus.

It will be readily understood that, throughout the preceding discussion, the above-described network functionalities and operations may correspond to a method for use in supporting operation of a network, such as a 5G wireless network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the network viewed as an apparatus, embodiments may be directed to improving internal operations of the network.

Further, it will be readily understood that embodiments relate to a network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a network control plane, devices operating in the data plane, or a combination thereof. Computing devices used to implement method operations may include a processor operatively coupled to memory, the memory providing instructions for execution by the processor to perform the method as described herein.

Various embodiments utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope.

What is claimed is:

1. A method for routing packets to a destination end point over a virtual network (VN) pre-configured on a network, the routing performed by a VN virtual router (v-router) associated with a VN node of the VN, the VN node supported by an associated physical network node of the network and interconnected with other VN nodes of the VN by logical tunnels, the method comprising the v-router:
   receiving a data packet associated with the VN and specifying the destination end point;
   obtaining an indication of location of the destination end point from a connection management (CM) entity tracking the end point;
   selecting one of the logical tunnels to forward the data packet toward the destination end point, the logical tunnel having ingress at the VN node and having an egress at a next VN node on a logical path between the VN node and the destination end point; and
   submitting the data packet to the selected logical tunnel for forwarding toward the next VN node;
wherein the obtaining the indication of location comprises the v-router:
   transmitting to the CM a location resolution request including a VN identifier corresponding to an identity of the VN, and a name identifier corresponding to the destination end point; and
   receiving from the CM a location resolution response including the VN identifier, the name identifier, and a location identifier corresponding to a current location of the destination end point.

2. The method of claim 1, wherein the location identifier identifies at least one of:
   a destination physical node tracking the current location of the destination end point;
   a destination VN node tracking the current location of the destination end point;
   a next VN node on a logical path between the v-router and the destination end point;
   a domain identifier of a current domain of the destination end point;
   a cluster identifier of a current cluster serving the destination end point; and
   an anchor point identifier of a current anchor point serving the destination end point.

3. The method of claim 2, wherein the location identifier comprises an address.

4. The method of claim 1, further comprising:
   updating an end point routing table with the indication of location associated with the destination end point.

5. The method of claim 4, wherein the indication of location associated with the destination end point is maintained in the end point routing table for a pre-determined period of time.

6. The method of claim 4, wherein a further location resolution request is sent to the CM entity after a pre-determined period of time to refresh the updated end point routing table.

7. A virtual router (v-router) for supporting routing of packets to a destination end point over a virtual network (VN) pre-configured on a network, the v-router associated with a VN node of the VN, the VN node supported by an associated physical network node of the network and interconnected with other VN nodes of the VN by logical tunnels, the v-router configured to:
   receive a data packet associated with the VN and specifying the destination end point;
   obtain an indication of location of the destination end point from a connection management (CM) entity tracking the end point;
   select one of the logical tunnels to forward the data packet toward the destination end point, the logical tunnel having ingress at the VN node and having an egress at a next VN node on a logical path between the VN node and the destination end point; and
   submit the data packet to the selected logical tunnel for forwarding toward the next VN node;
wherein the v-router is configured, in support of obtaining the indication of location, to:
   transmit, to the CM entity, a location resolution request including a VN identifier corresponding to an identity of the VN, and a name identifier corresponding to the destination end point; and
   receive, from the CM entity, a location resolution response including the VN identifier, the name identifier, and a location identifier corresponding to a current location of the destination end point.

8. The v-router of claim 7, wherein the location identifier identifies at least one of:
   a destination physical node tracking the current location of the destination end point;
   a destination VN node tracking the current location of the destination end point;
   a next VN node on a logical path between the v-router and the destination end point;

a domain identifier of a current domain of the destination end point;

a cluster identifier of a current cluster serving the destination end point; and an anchor point identifier of a current anchor point serving the destination end point.

9. The v-router of claim 7, wherein the location identifier comprises an address.

10. The v-router of claim 7, further configured to:
update an end point routing table with the indication of location associated with the destination end point.

11. The v-router of claim 10, wherein the indication of location associated with the destination end point is maintained in the end point routing table for a pre-determined period of time.

12. The v-router of claim 10, wherein a further location resolution request is sent to the CM entity after a pre-determined period of time to refresh the updated end point routing table.

13. A system comprising a virtual router (v-router) and a connection management (CM) entity, the v-router being for supporting routing of packets to a destination end point over a virtual network (VN) pre-configured on a network, the v-router associated with a VN node of the VN, the VN node supported by an associated physical network node of the network and interconnected with other VN nodes of the VN by logical tunnels, the v-router configured to:

receive a data packet associated with the VN and specifying the destination end point;

obtain an indication of location of the destination end point from the CM entity tracking the end point;

select one of the logical tunnels to forward the data packet toward the destination end point, the logical tunnel having ingress at the VN node and having an egress at a next VN node on a logical path between the VN node and the destination end point; and submit the data packet to the selected logical tunnel for forwarding toward the next VN node; wherein the v-router is further configured to transmit, to the CM entity, a location resolution request including a VN identifier corresponding to an identity of the VN, and a name identifier corresponding to the destination end point; and the CM entity is configured to transmit, to the v-router, a location resolution response including the VN identifier, the name identifier, and a location identifier corresponding to a current location of the destination end point.

14. The system of claim 13, further comprising the VN node configured to receive the data packet from the v-router.

* * * * *